United States Patent
Leiba

(10) Patent No.: US 9,997,838 B2
(45) Date of Patent: Jun. 12, 2018

(54) MILLIMETER-WAVE SLOT ANTENNA SYSTEMS AND METHODS WITH IMPROVED GAIN

(71) Applicant: Siklu Communication Ltd., Petach-Tikva (IL)

(72) Inventor: Yigal Leiba, Holon (IL)

(73) Assignee: Siklu Communication Ltd., Petach-Tikva (IL)

( * ) Notice: Subject to any disclaimer, the term of this patent is extended or adjusted under 35 U.S.C. 154(b) by 242 days.

(21) Appl. No.: 14/064,341

(22) Filed: Oct. 28, 2013

(65) Prior Publication Data

US 2014/0050283 A1   Feb. 20, 2014

Related U.S. Application Data

(63) Continuation-in-part of application No. 12/892,944, filed on Sep. 29, 2010, now Pat. No. 8,599,958.

(51) Int. Cl.
| | |
|---|---|
| *H01Q 13/22* | (2006.01) |
| *H01Q 21/00* | (2006.01) |
| *H04L 27/36* | (2006.01) |

(52) U.S. Cl.
CPC .......... *H01Q 13/22* (2013.01); *H01Q 21/005* (2013.01); *H01Q 21/0043* (2013.01); *H04L 27/36* (2013.01); *Y10T 29/49016* (2015.01)

(58) Field of Classification Search
CPC .... H01Q 13/20; H01Q 13/22; H01Q 21/0043; H01Q 21/005
See application file for complete search history.

(56) References Cited

U.S. PATENT DOCUMENTS

| | | | |
|---|---|---|---|
| 2,477,510 A | 7/1949 | Chu | |
| 3,530,479 A | 9/1970 | Waldron | |
| 3,721,988 A | 3/1973 | Schwartz et al. | |
| 4,330,784 A | 5/1982 | Ryno et al. | |
| 4,334,229 A | 6/1982 | Boblett | |
| 4,872,020 A | 10/1989 | Ajioka | |
| 6,188,368 B1 | 2/2001 | Koriyama et al. | |
| 7,379,029 B2 | 5/2008 | Rolnik | |
| 8,149,177 B1 * | 4/2012 | Callus | H01Q 1/286 343/705 |
| 2012/0068900 A1 | 3/2012 | Yatabe et al. | |
| 2014/0266946 A1 * | 9/2014 | Bily | H01Q 13/22 343/771 |

FOREIGN PATENT DOCUMENTS

WO   WO 2012116728   9/2012

* cited by examiner

*Primary Examiner* — Robert Karacsony
(74) *Attorney, Agent, or Firm* — Active Knowledge Ltd.

(57) ABSTRACT

Various embodiments of a millimeter-wave antenna system configured to enhance the gain in a communication network, in which one or more slotted wave-guides produce radiating slot structures that form accurate high-gain millimeter-wave radiation patterns. The system comprises one or more slotted wave-guides to transport millimeter-waves, a PCB including a substrate lamina and an electrically-conductive lamina with two or more highly accurate slots, and an electrically-conductive metal cover that intersects the electrically-conductive lamina to form an enclosed wave-guide cavity. Various embodiments of methods for producing the millimeter-wave antenna system, including different techniques for creating the accuracy of the slots in the slotted wave-guides.

30 Claims, 17 Drawing Sheets

MILLIMETER-WAVE SLOT ANTENNA SYSTEMS AND METHODS WITH IMPROVED GAIN

CROSS-REFERENCE TO RELATED APPLICATIONS

This application is a continuation-in-part of application Ser. No. 12/892,944, filed on Sep. 29, 2010.

BACKGROUND

Every radio network utilises one or more electromagnetic waves of various frequencies and wavelengths. Each such wave is subject to various communications conditions dependent, at least to some degree, on the properties of the particular wave. Extremely high frequency waves, typically in the range of 30 GHz-300 GHz, are often called "millimeter-waves" due to their very short wavelength. Millimeter-waves typically travel by line of sight, but they have relatively high free space loss which limits their effective range to no more than a few kilometers. Any feature of a millimeter-wave network that would increase gain would improve the quality of communication and increase the effective range of the system. One aspect of a millimeter-wave network that may be improved is the antenna or antenna system.

SUMMARY

Described herein are antenna systems and methods in millimeter-wave networks, typically operating within the range of 30 GHz-300 GHz, wherein such antennas are engineered to increase the communication gain of the network, and thereby increase both the quality and range of the network.

One embodiment is a system that includes a slotted wave-guide configured to transport millimeter-waves, wherein the slotted wave-guide includes first, a printed-circuit-board comprising an electrically-conductive lamina mounted on a substrate lamina, wherein the electrically-conductive lamina is cut accurately with at least two separate slots, and second, an electrically-conductive metal cover mounted on the electrically-conductive lamina such that an enclosed wave-guide cavity is formed above said at least two separate slots, thereby forming the slotted wave-guide. Also in this particular embodiment, the slotted wave-guide is configured to guide millimeter-waves over said multiple separate slots, thereby radiating millimeter-waves via the multiple separate slots, thereby forming a predetermined millimeter-wave radiation pattern.

One embodiment is a method for producing an antenna system in a millimeter-wave network, wherein the antenna system is a slotted wave-guide that increases the communication gain in the network. In one particular form of such embodiment, at least two separate slots in an electrically-conducive lamina of a printed-circuit-board are accurately formed, such that the multiple slots are configured to radiate millimeter-waves, and the at least two separate slots are located in respect to each other in such a way as to facilitate synthesis of an accurate millimeter-wave radiation pattern. Also in this particular embodiment, an electrically-conductive metal cover is mounted on top of the electrically-conductive lamina such that an enclosed wave-guide cavity is formed above the at least two separate slots, thereby forming a first slotted wave-guide configured to function as a millimeter-wave antenna system.

One embodiment is a communication system that includes: (i) a Radio Frequency Integrated Circuit (RFIC) including a radio transmitter, operative to transmit millimeter-wave signals, the radio transmitter includes a Power Amplifier (PA) operative to output the millimeter-wave signals at a low power level of between −10 dBm and 20 dBm, and a Voltage Controlled Oscillator (VCO) and a synthesizer operative to drive a mixer up-converting signals into the millimeter-wave signals, and (ii) a first slotted waveguide operating as a first directional antenna having a gain of at least 30 dBi, wherein the radio transmitter and the first slotted waveguide are configured to transmit the millimeter-wave signals at a level of at least 20 dBmi, using a bandwidth of at least 100 MHz and 16-levels Quadrature-Amplitude-Modulation (16QAM), facilitating data rates of at least 200 Mbps, while the RFIC is configured to keep the power consumption of the radio transmitter under 2.5 W.

BRIEF DESCRIPTION OF THE DRAWINGS

The embodiments are herein described, by way of example only, with reference to the accompanying drawings. No attempt is made to show structural details of the embodiments in more detail than is necessary for a fundamental understanding of the embodiments. In the drawings.

DETAILED DESCRIPTION

Figure 1:
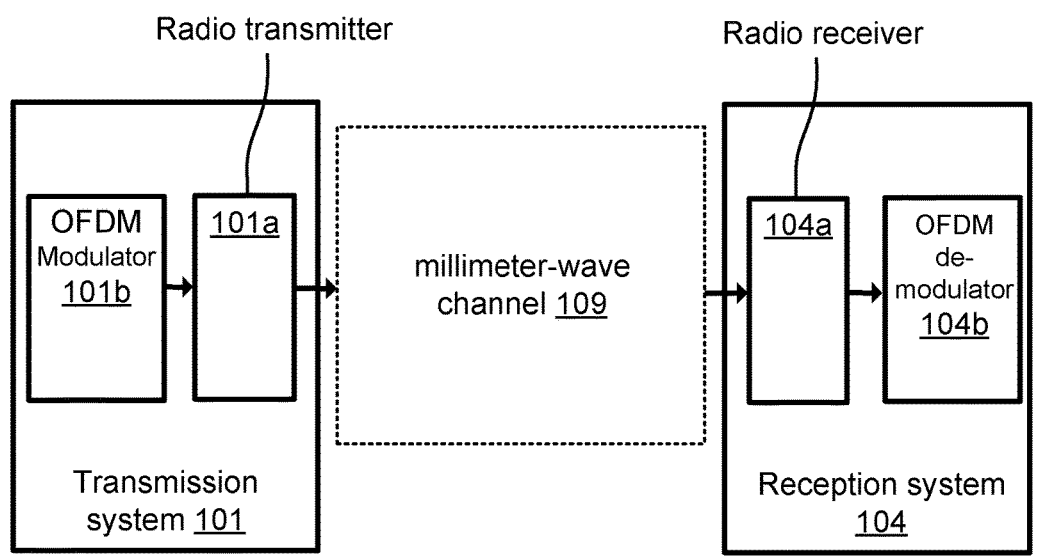
FIG. 1 illustrates one embodiment of a Point-to-Point communication system.

Many Point-to-Point communication systems, typically used for backhauling, have demanding transmission data rate requirements. Achieving transmission data rates in excess of 200 Mbps typically requires the use of radio systems having communication bandwidths in excess of 100 MHz. Such wide-band communication bandwidths affect the frequency response of radio transmitters and receivers, which should be ideally flat. Radio Frequency Integrated Circuit (RFIC) may be used to realize radio transmitters and receivers. Using millimeter-wave Radio Frequency Integrated Circuits to realize Point-to-Point communication systems having communication bandwidths in excess of 100 MHz may result in radio transmitters and receivers having substantially non-flat frequency responses. Millimeter-wave Radio Frequency Integrated Circuits, such as Silicon-Germanium (SiGe) RFIC comprising high frequency Heterojunction Bipolar Transistors (HBT), operating at a bandwidths of over 100 MHz, may have a transmission frequency response variation of least 4 dB across a 100 MHz transmission bandwidth. This variation needs to be compensated in order to achieve high data transmission rates. In one embodiment, the variation of least 4 dB is compensated using Orthogonal Frequency Division Multiplexing (OFDM) by both the transmitters and receivers of highly directional millimeter-wave Point-to-Point links. Compensating with OFDM for fluctuations in transmission frequency response occurring in millimeter-wave Radio Frequency Integrated Circuits operating at bandwidths above 100 Mhz is unknown for highly directional millimeter-wave Point-to-Point links, which have a flat channel response and do not require using OFDM to compensate for channel response fluctuations.

In one embodiment, A Point-to-Point communication system includes (i) a millimeter-wave channel having a substantially flat channel transfer function between a first frequency of millimeter-waves and a second frequency of millimeter-waves, the two frequencies are separated by at least 500 MHz, (ii) a transmission system comprising an Orthogonal Frequency Division Multiplexing (OFDM) modulator outputting an OFDM signal having a bandwidth of at least 100 MHz, and a radio transmitter having a substantially non-flat transmission transfer function over the bandwidth of the OFDM signal, up-converting the OFDM signal into a millimeter-wave signal located between the first frequency and the second frequency, and transmitting the millimeter-wave signal via the millimeter-wave channel, and (iii) a reception system comprising a radio receiver having a substantially non-flat reception transfer function over the bandwidth of the OFDM signal, receiving the millimeter-wave signal via the millimeter-wave channel and down-converting the millimeter-wave signal into a reconstruction of the OFDM signal having a bandwidth of at least 100 MHz, and an OFDM de-modulator compensating for the substantially non-flat transmission transfer function and the substantially non-flat reception transfer function, by de-modulating the reconstruction of the OFDM signal.

FIG. 1 illustrates one embodiment of a Point-to-Point communication system. A millimeter-wave channel 109 has a substantially flat channel transfer function between a first frequency of millimeter-waves and a second frequency of millimeter-waves, the two frequencies are separated by at least 500 MHz. A transmission system 101 includes an Orthogonal Frequency Division Multiplexing (OFDM) modulator 101b and a radio transmitter 101a. The OFDM modulator 101b outputs an OFDM signal having a bandwidth of at least 100 MHz. The radio transmitter 101a has a substantially non-flat transmission transfer function over the bandwidth of the OFDM signal. The radio transmitter 101a up-converts the OFDM signal into a millimeter-wave signal located between the first frequency and the second frequency, and transmits the millimeter-wave signal via the millimeter-wave channel 109. A reception system 104 includes a radio receiver 104a and an OFDM de-modulator 104b. The radio receiver 104a has a substantially non-flat reception transfer function over the bandwidth of the OFDM signal. The radio receiver 104a receives the millimeter-wave signal via the millimeter-wave channel 109 and down-converts the millimeter-wave signal into a reconstruction of the OFDM signal having a bandwidth of at least 100 MHz. The OFDM de-modulator 104b compensates for the substantially non-flat transmission transfer function and the substantially non-flat reception transfer function, by de-modulating the reconstruction of the OFDM signal.

Figure 2A:
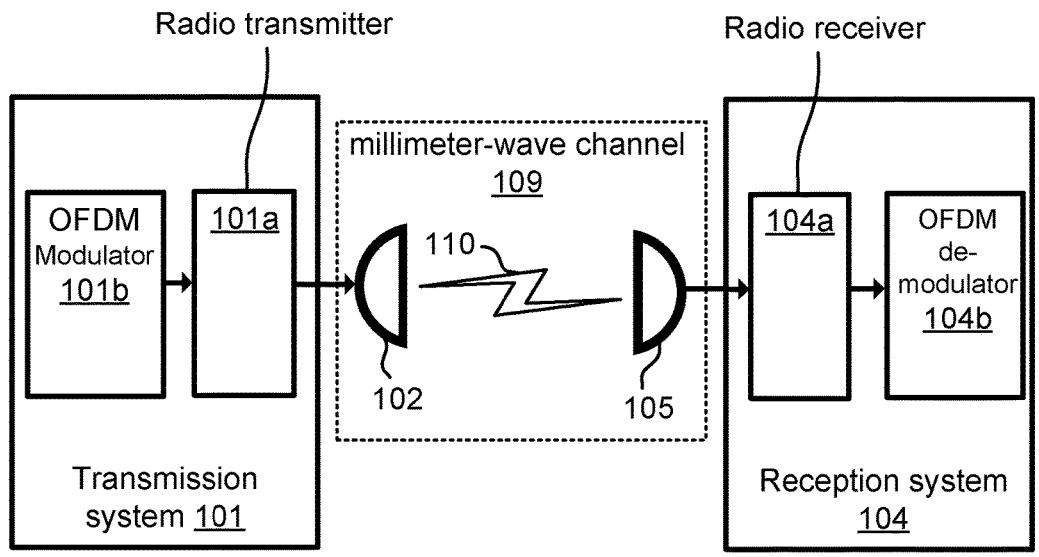
FIG. 2A illustrates one embodiment of a wireless Point-to-Point communication system.

FIG. 2A illustrates one embodiment of a wireless Point-to-Point communication system. The millimeter-wave channel 109 is a wireless channel 110 comprising a first directional antenna 102 through which the millimeter-wave signal is transmitted, and a second directional antenna 105 through which the millimeter-wave signal is received, and the combined gain of the first directional antenna 102 and the second directional antenna 105 is at least 50 dBi, causing the millimeter-wave channel 109 to have the substantially flat channel transfer function between the first frequency and the second frequency.

Figure 2B:
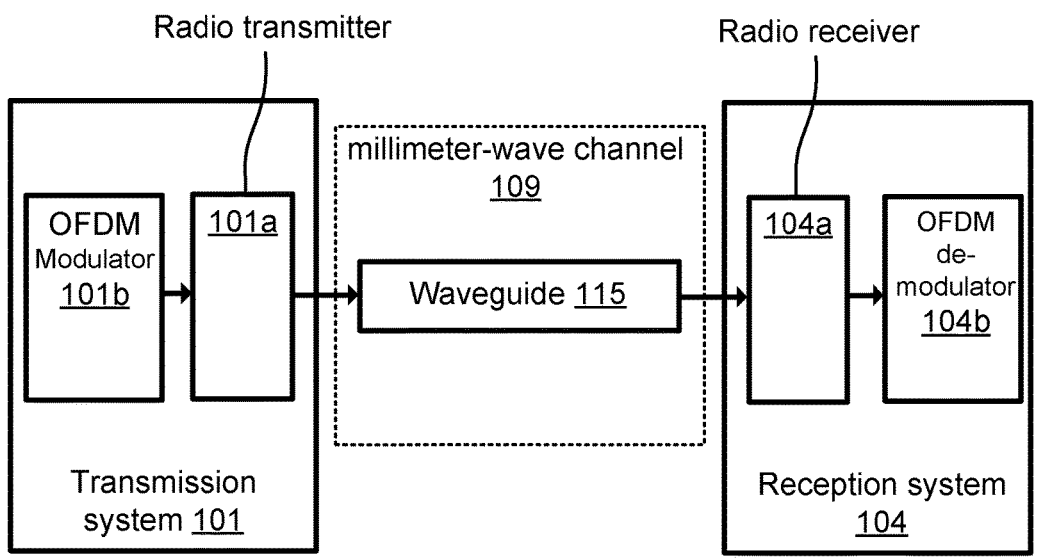
FIG. 2B illustrates one embodiment of a waveguide-based Point-to-Point communication system.

FIG. 2B illustrates one embodiment of a waveguide-based Point-to-Point communication system. The millimeter-wave channel 109 is a waveguide 115 through which the millimeter-wave signal is transmitted. The waveguide 115 has a substantially flat channel transfer function between the first frequency and the second frequency.

In one embodiment, the substantially flat channel transfer function of the millimeter-wave channel is flat to a degree that substantially does not require the use of an OFDM modulator and an OFDM de-modulator to facilitate communication over the millimeter-wave channel. OFDM is typically used to facilitate communication over channels that have a substantially non-flat channel transfer function. Different tones of OFDM signal, also referred to as sub-carriers, are independently de-modulated by an OFDM receiver after being transmitted over a channel having a substantially non-flat channel transfer function. The act of independently de-modulating the tones results in an inherent immunity to variation in frequency responses associated with the channel having a substantially non-flat channel transfer function. This immunity is essentially not required if the channel has a substantially flat channel transfer function. A typical channel having a substantially non-flat channel transfer function may be a wireless channel formed between a transmitter and a receiver both located indoors. The wireless channel suffers from indoor multi-path reflections causing the wireless channel to have a substantially non-flat channel transfer function. According to one example, the substantially flat channel transfer function of the millimeter-wave channel is achieved using directional antennas 102, 105. The directional antennas 102, 105 eliminate multi-path reflections. Typically, directional antennas 102, 105 are used in Point-to-Point communication systems. A Point-to-Point communication system having antennas 102, 105 does not require the use of OFDM in order to compensate for multi-path reflections.

In one embodiment, the second millimeter wave frequency is between 50 GHz and 100 GHz. In one embodiment, the first millimeter wave frequency is above 57 GHz, and the second millimeter-wave frequency is below 86 GHz. In one embodiment, the OFDM signal having a bandwidth of at least 100 MHz is used to transmit data over the millimeter-wave channel at a rate of over 100 Mbps. In one embodiment, the OFDM signal having a bandwidth of at least 100 MHz has a bandwidth of at least 200 MHz, and is used to transmit data over the millimeter-wave channel at a rate of over 200 Mbps. In one embodiment, the OFDM signal having a bandwidth of at least 100 MHz has a bandwidth of at least 500 MHz, and is used to transmit data over the millimeter-wave channel at a rate of over 500 Mbps.

Figure 3:
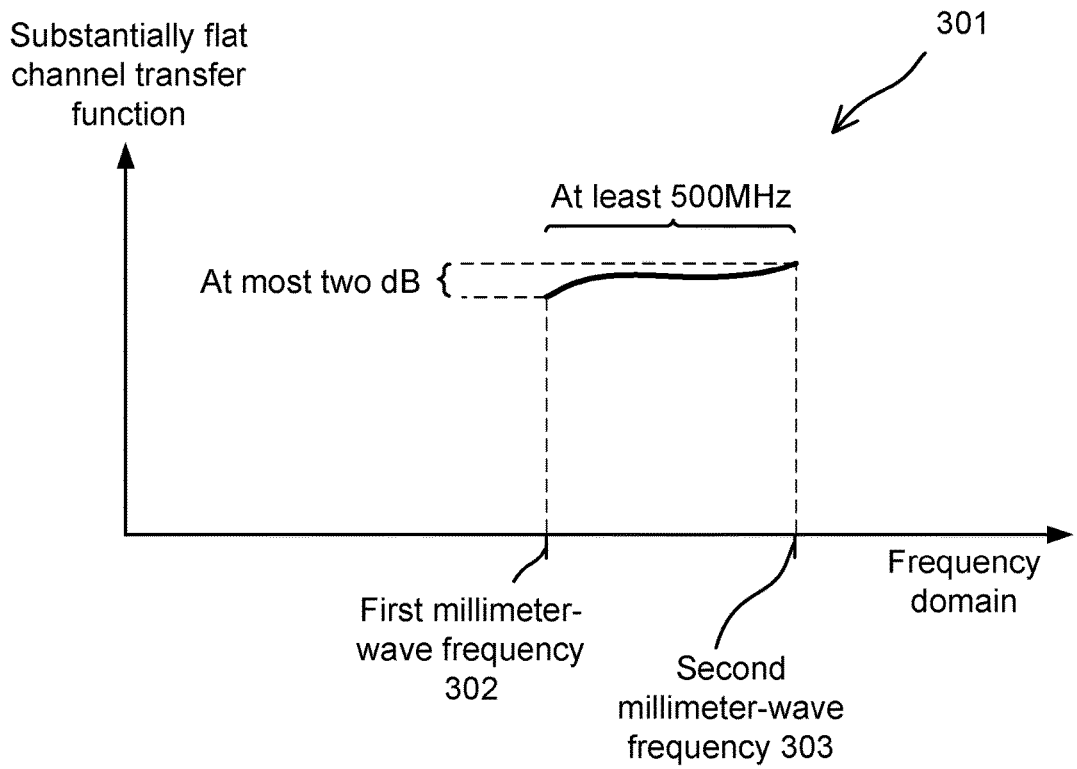
FIG. 3 Illustrates one embodiment of a substantially flat channel transfer function.

FIG. 3 Illustrates one embodiment of the substantially flat channel transfer function. The substantially flat channel transfer function 301 is a transfer function having a difference of at most two dB between the highest magnitude and lowest magnitude of the transfer function in the range between the first frequency and the second frequency. According to one example, the highest magnitude of the substantially flat channel transfer function 301, which occurs by way of example at the second millimeter-wave frequency 303, is −78.5 dB, and the lowest magnitude of the substantially flat channel transfer function 301, which occurs by way of example at the first millimeter-wave frequency 302, is −80 dB. The difference between the highest magnitude and the lowest magnitude is therefore 1.5 dB. It is noted that the highest magnitude can occur at any frequency between the first millimeter-wave frequency 302 and the second millimeter-wave frequency 303. It is noted that the lowest magnitude can occur at any frequency between the first millimeter-wave frequency 302 and the second millimeter-wave frequency 303. According to one example, the first millimeter-wave frequency 302 is 60 GHz and the second millimeter-wave frequency 303 is 60.5 GHz. According to one example, the first millimeter-wave frequency 302 is 70 GHz and the second millimeter-wave frequency 303 is 71 GHz. In one embodiment, the substantially flat channel transfer function 301 is measured from a port of the first directional antenna 102 to a port of the second directional antenna 105, or vice-versa. In one embodiment, the substantially flat channel transfer function 301 is measured from a first port of waveguide 115 to a second port of waveguide 115, or vice-versa.

Figure 4:
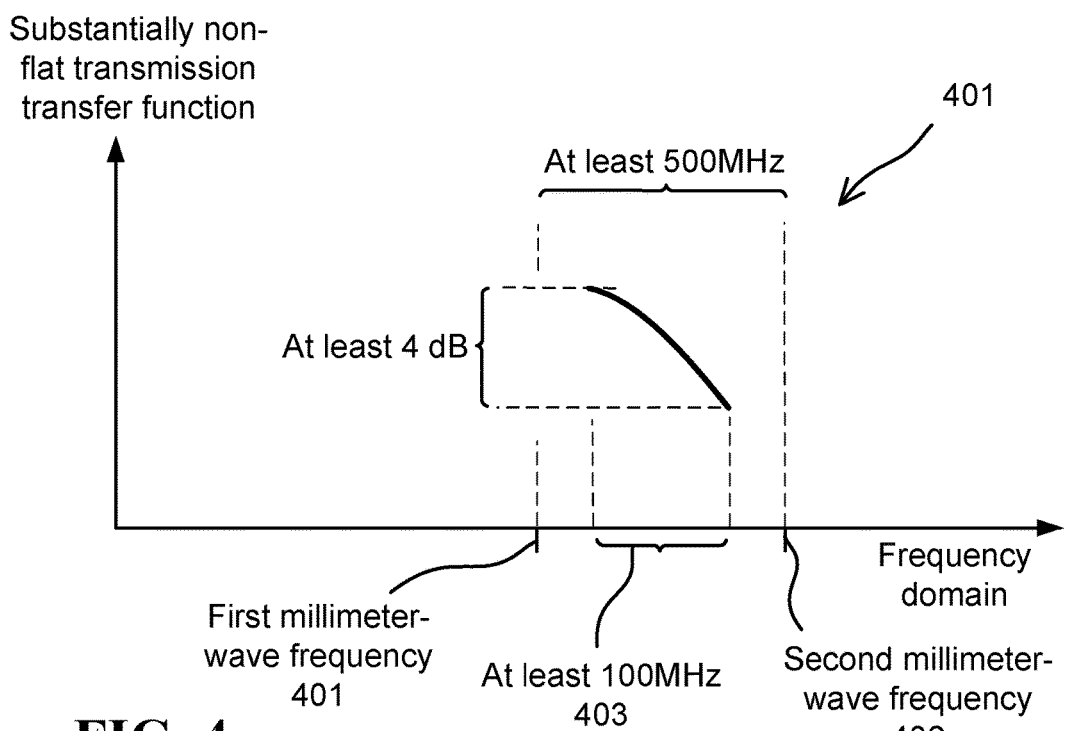
FIG. 4 illustrates one embodiment of a substantially non-flat transmission transfer function.

FIG. 4 illustrates one embodiment of the substantially non-flat transmission transfer function. The substantially non-flat transmission transfer function 401 has a difference of at least 4 dB between the highest magnitude and lowest magnitude of the substantially non-flat transmission transfer function 401, in the range of the at least 100 MHz 403.

According to one example, the highest magnitude of the substantially non-flat transmission transfer function 401, which occurs by way of example at the first millimeter-wave frequency 401, is 20 dB, and the lowest magnitude of the substantially flat transmission transfer function 401, which occurs by way of example at the second millimeter-wave frequency 402, is 13 dB. The difference between the highest magnitude and the lowest magnitude is therefore 7 dB. It is noted that the highest magnitude can occur at any frequency between the first millimeter-wave frequency 401 and the second millimeter-wave frequency 402. It is noted that the lowest magnitude can occur at any frequency between the first millimeter-wave frequency 401 and the second millimeter-wave frequency 402. According to one example, the first millimeter-wave frequency 401 is 60 GHz, the second millimeter-wave frequency 402 is 60.5 GHz, and the at least 100 MHz 403 occupied by the OFDM signal transmitted by the radio transmitter 101*a* is 200 MHz. According to one example, the first millimeter-wave frequency 401 is 70 GHz, the second millimeter-wave frequency 402 is 71 GHz, and the at least 100 MHz 403 occupied by the OFDM signal transmitted by the radio transmitter 101*a* is 500 MHz.

In one embodiment, the substantially non-flat transmission transfer function 401, or any transmission transfer function related to a radio transmitter such as radio transmitter 101*a*, is defined as the frequency response of a radio transmitter measured from a Base-Band level of the radio transmitter, to the output of the radio transmitter, taking into account frequency translation occurring during up-conversion of a Base-Band signal into a millimeter-wave signal.

Figure 5:
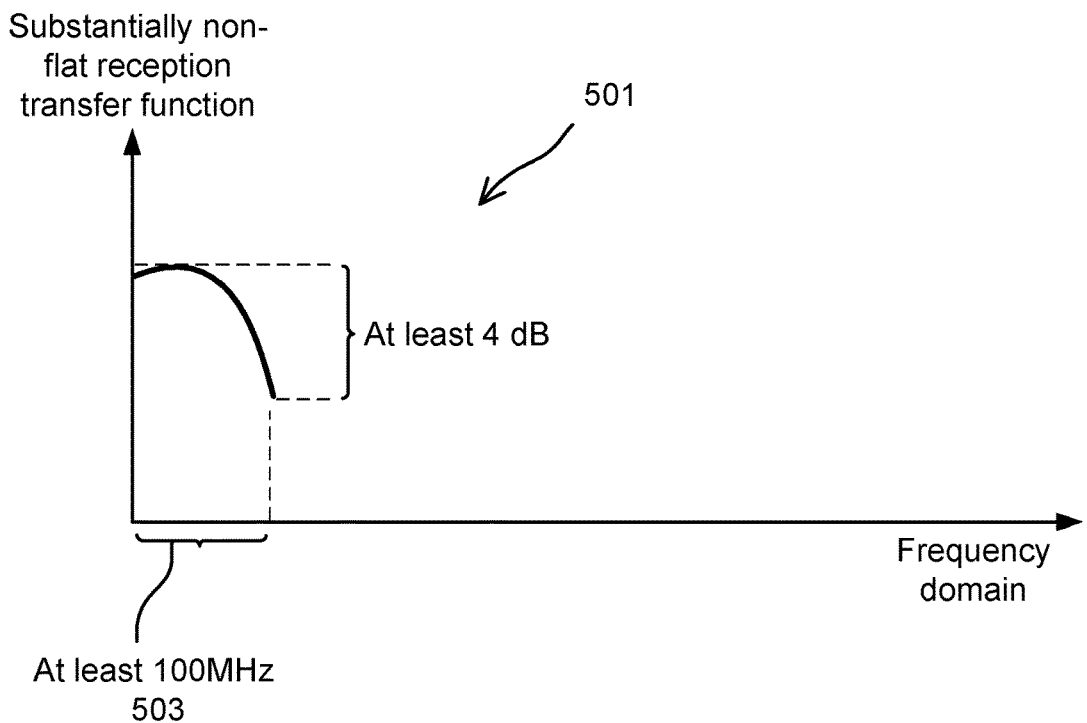
FIG. 5 illustrates one embodiment of a substantially non-flat reception transfer function.

FIG. 5 illustrates one embodiment of the substantially non-flat reception transfer function. The substantially non-flat reception transfer function 501 has a difference of at least 4 dB between the highest magnitude and lowest magnitude of the substantially non-flat reception transfer function 501 in the range of the at least 100 MHz 503. According to one example, the highest magnitude of the substantially non-flat reception transfer function 501, which occurs by way of example close to zero Hz, is 100 dB, and the lowest magnitude of the substantially flat reception transfer function 501, which occurs by way of example at 100 MHz, is 94 dB. The difference between the highest magnitude and the lowest magnitude is therefore 6 dB. It is noted that the highest magnitude can occur at any frequency in the at least 100 MHz 503. It is noted that the lowest magnitude can occur at any frequency in the least 100 MHz 503.

In one embodiment, the substantially non-flat reception transfer function 501, or any reception transfer function related to a radio receiver such as radio receiver 104*a*, is defined as the frequency response of a radio receiver measured from a millimeter-wave input of the radio receiver, to the Base-Band output of the radio receiver, taking into account frequency translation occurring during down-conversion of a millimeter-wave signal into a Base-Band signal.

In one embodiment, the radio transmitter is a Radio Frequency Integrated Circuit (RFIC), having a substantially non-flat transmission transfer function as a result of being an Integrated Circuit. RFIC operating at millimeter-wave bands and operative to transmit OFDM signals having a bandwidth of at least 100 MHz, typically results in a substantially non-flat transmission transfer function. More specifically, Silicon-Germanium (SiGe) RFIC and CMOS RFIC produce large variations in frequency response over bandwidths exceeding 100 MHz. In one embodiment, the radio receiver is a Radio Frequency Integrated Circuit (RFIC), having a substantially non-flat reception transfer function as a result of being an Integrated Circuit.

In one embodiment, a Point-to-Point communication system includes (i) a millimeter-wave channel having a substantially flat channel transfer function between a first frequency of millimeter-waves and a second frequency of millimeter-waves, the two frequencies are separated by at least 500 MHz, (ii) a transmission system comprising an Orthogonal Frequency Division Multiplexing (OFDM) modulator configured to output an OFDM signal having a bandwidth of at least 100 MHz, and a radio transmitter having a transmission transfer function, configured to up-convert the OFDM signal into a millimeter-wave signal located between the first frequency and the second frequency, and to transmit the millimeter-wave signal via the millimeter-wave channel, and (iii) a reception system comprising a radio receiver having a reception transfer function that in combination with the transmission transfer function of the radio transmitter results in a substantially non-flat radio transfer function over the bandwidth of the OFDM signal, the radio receiver configured to receive the millimeter-wave signal via the millimeter-wave channel and down-convert the millimeter-wave signal into a reconstruction of the OFDM signal having a bandwidth of at least 100 MHz, and an OFDM de-modulator configured to compensate for the substantially non-flat radio transfer function, by de-modulating the reconstruction of the OFDM signal.

Figure 6:
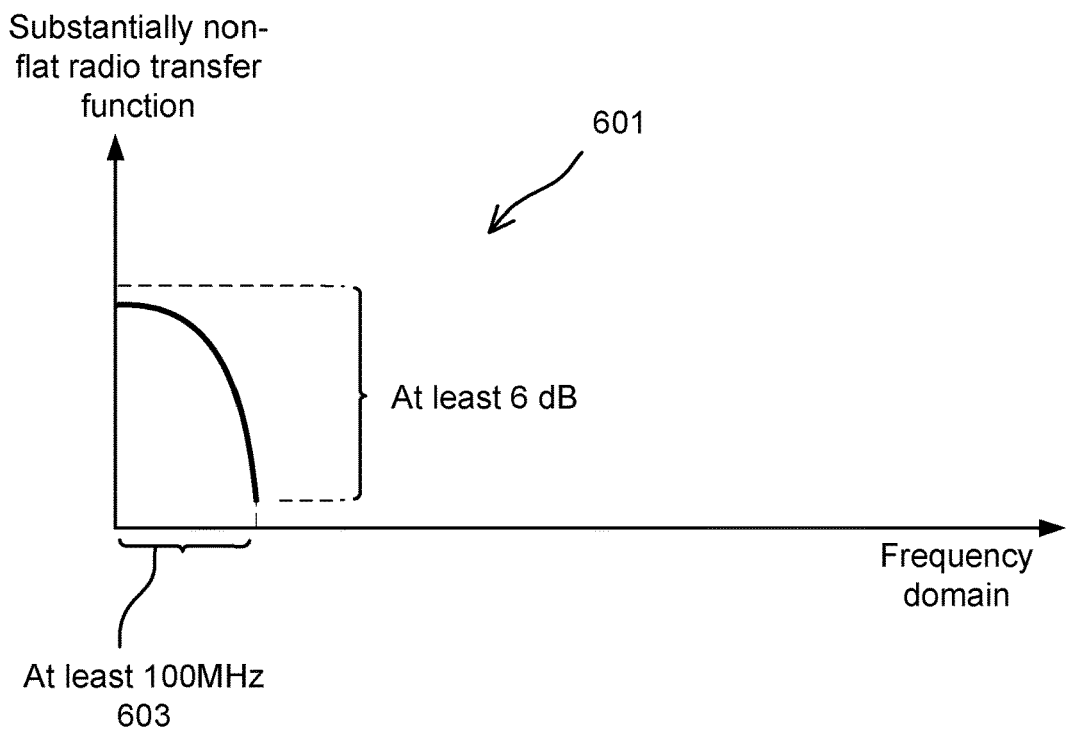
FIG. 6 illustrates one embodiment of a substantially non-flat radio transfer function.
Figure 7A:
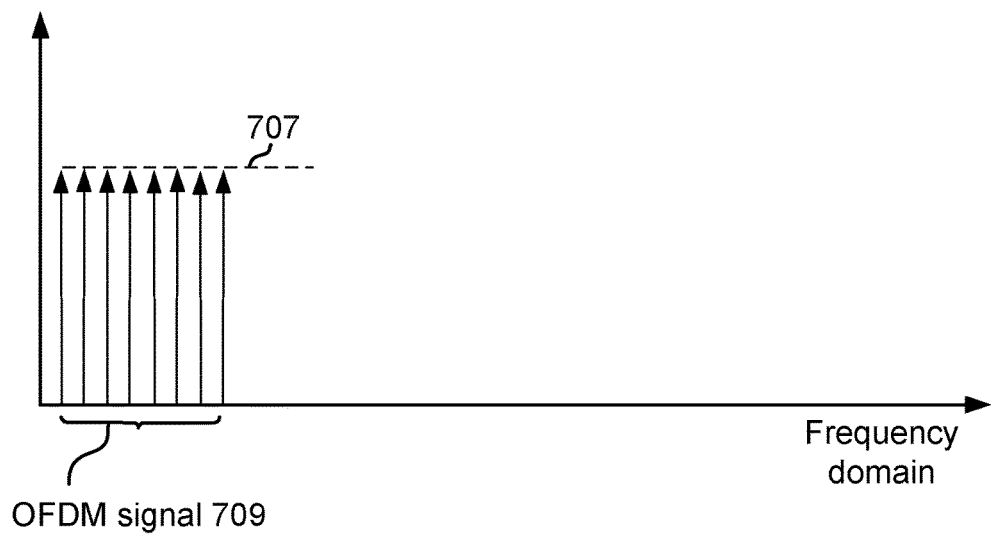
FIG. 7A illustrates one embodiment of OFDM signal propagation through a Point-to-Point communication system.
Figure 7B:
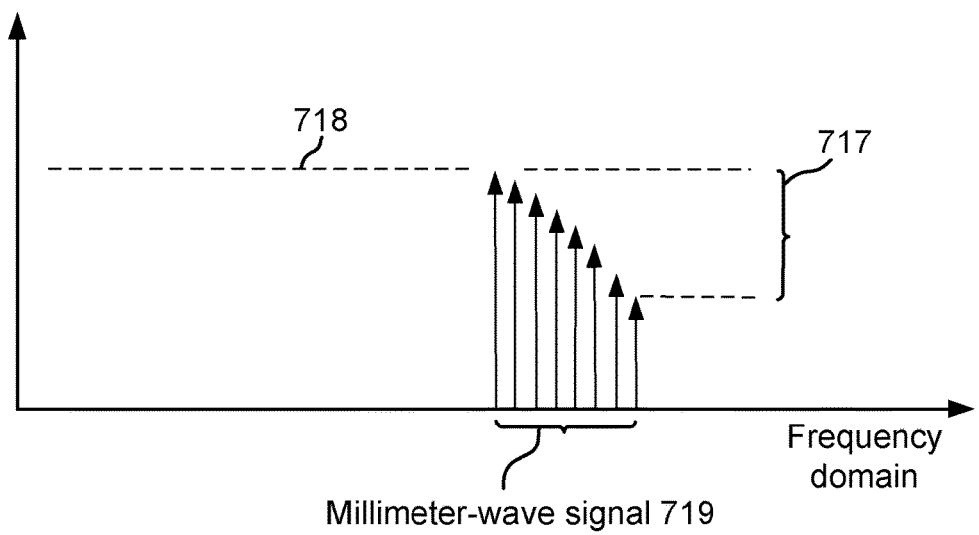
FIG. 7B illustrates one embodiment of OFDM signal propagation through a Point-to-Point communication system.
Figure 7C:
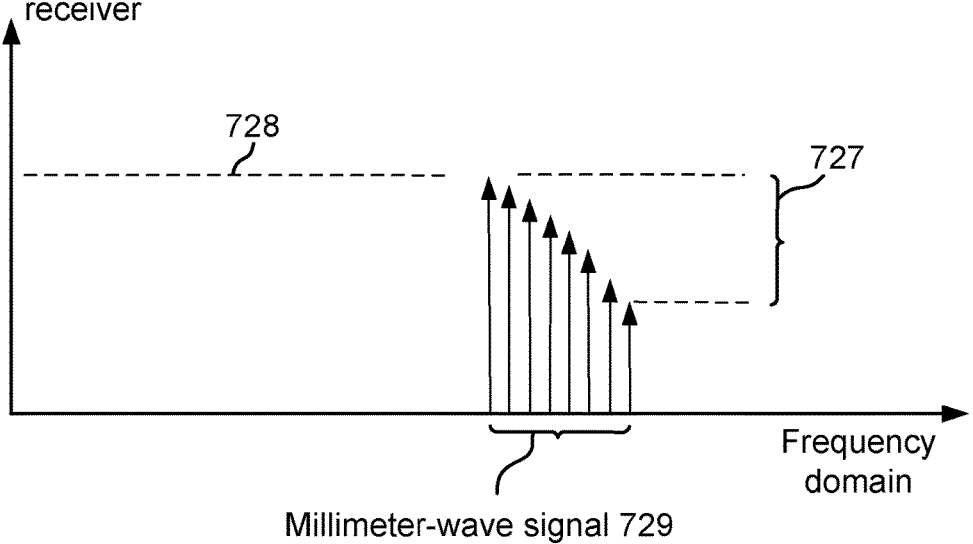
FIG. 7C illustrates one embodiment of OFDM signal propagation through a Point-to-Point communication system.
Figure 7D:
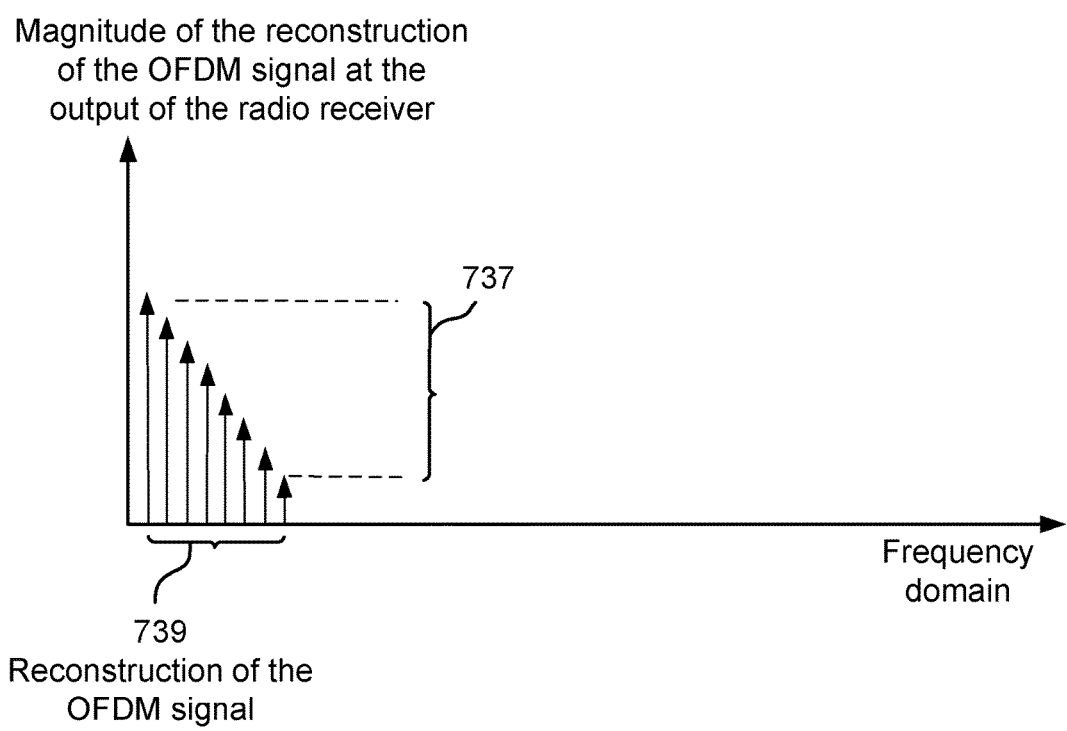
FIG. 7D illustrates one embodiment of OFDM signal propagation through a Point-to-Point communication system.

FIG. 6 illustrates one embodiment of the substantially non-flat radio transfer function. The substantially non-flat radio transfer function 601 has a difference of at least 6 dB between the highest magnitude and lowest magnitude of the substantially non-flat radio transfer function 601 in the range of the at least 100 MHz 603. According to one example, the highest magnitude of the substantially non-flat reception transfer function 601, which occurs by way of example close to zero Hz, is 120 dB, and the lowest magnitude of the substantially flat reception transfer function 501, which occurs by way of example at 100 MHz, is 110 dB. The difference between the highest magnitude and the lowest magnitude is therefore 10 dB. It is noted that the highest magnitude can occur at any frequency in the at least 100 MHz 603. It is noted that the lowest magnitude can occur at any frequency in the least 100 MHz 603.

In one embodiment, the substantially non-flat radio transfer function 601, or any radio transfer function related to a radio receiver and a radio transmitter such as radio receiver 104*a* and radio transmitter 101*a*, is defined as the sum of a substantially non-flat transmission transfer function and a substantially non-flat reception transfer function. In one embodiment, the radio transmitter is a Radio Frequency Integrated Circuit (RFIC), and the radio receiver is a RFIC, resulting in a substantially non-flat radio transfer functions.

FIG. 2A, FIG. 7A, FIG. 7B, FIG. 7C, and FIG. 7D illustrate one embodiment of OFDM signal propagation through a Point-to-Point communication system. A millimeter-wave channel 109 has a substantially flat channel transfer function between a first frequency of millimeter-waves and a second frequency of millimeter-waves, the two frequencies are separated by at least 500 MHz. A transmission system 101 includes an Orthogonal Frequency Division Multiplexing (OFDM) modulator 101*b* and a radio transmitter 101*a*. The OFDM modulator 101*b* outputs an OFDM signal 709 having a bandwidth of at least 100 MHz. The OFDM signal 709 comprises 8 tones by way of example. The tones are illustrated as vertical arrows. All the tones are of amplitude 707 by way of example. The radio transmitter 101*a* has a substantially non-flat transmission transfer function over the bandwidth of the OFDM signal. The radio transmitter 101*a* up-converts OFDM signal 709 into a millimeter-wave signal 719 located between the first frequency and the second frequency, and transmits the millimeter-wave signal 719 via the millimeter-wave channel 109. A reception system 104 includes a radio receiver 104*a* and an OFDM de-modulator 104*b*. The radio receiver 104*a* has a substantially non-flat reception transfer function over the bandwidth of the OFDM signal. The radio receiver 104*a* receives the millimeter-wave signal 729 via the millimeter-wave channel 109 and down-converts the millimeter-wave signal 729 into a reconstruction 739 of the OFDM signal having a bandwidth of at least 100 MHz. The OFDM de-modulator 104*b* compensates for the substantially non-flat transmission transfer function and the substantially non-flat reception transfer function, by de-modulating the reconstruction 739 of the OFDM signal. The 8 tones of millimeter-wave signal 719, illustrated as vertical arrows, are a frequency-translated version of the OFDM signal 709. The 8 tones of millimeter-wave signal 719 have an amplitude variation 717 which is substantially non-zero, and may be 4 dB by way of example. Amplitude variation 717, as well as phase variation not illustrated, are a direct result of the substantially non-flat transmission transfer function of radio transmitter 101*a*. Power level 718 may be 0 dBm by way of example. The 8 tones of millimeter-wave signal 729, illustrated as vertical arrows, are an attenuated version of millimeter-wave signal 719, wherein the attenuation is the result of millimeter-wave channel 109 including a wireless channel 110. Power level 728 may be −100 dBm by way of example. The 8 tones of millimeter-wave signal 729 have an amplitude variation 727 which is substantially equal to amplitude variation 717. This is a result of millimeter-wave channel 109 having a substantially flat channel transfer function. The 8 tones of the reconstruction 739 of the OFDM signal, illustrated as vertical arrows, are a frequency-translated version of millimeter-wave signal 729. The 8 tones of the reconstruction 739 of the OFDM signal have an amplitude variation 737 which is substantially non-zero, and may be 8 dB by way of example. Amplitude variation 737, as well as phase variation not illustrated, are a direct result of the substantially non-flat reception transfer function of radio receiver 104*a* and the substantially non-flat transmission transfer function of radio transmitter 101*a*. It is noted that the amplitude variation 737, as well as phase variation not illustrated, are substantially not a result of the millimeter-wave channel 109, since millimeter-wave channel 109 has a substantially flat channel transfer function. Amplitude variation 737, as well as phase variation not illustrated, are inherently compensated during the course of de-modulating the reconstruction 739 of the OFDM signal by the OFDM de-modulator 104*b*.

In one embodiment, a Point-to-Point communication system includes (i) a millimeter-wave channel having a substantially flat channel transfer function between a first frequency of millimeter-waves and a second frequency of millimeter-waves, the two frequencies are separated by at least 500 MHz, (ii) a transmission system configured to transmit an Orthogonal Frequency Division Multiplexing (OFDM) signal having a bandwidth of at least 100 MHz over the millimeter-wave channel and between the first frequency and the second frequency, and (iii) a reception system comprising a radio receiver having a substantially non-flat reception transfer function over the bandwidth of the OFDM signal, configured to receive the millimeter-wave signal via the millimeter-wave channel and down-convert the millimeter-wave signal into a reconstruction of the OFDM signal having a bandwidth of at least 100 MHz, and an OFDM de-modulator configured to compensate for the substantially non-flat reception transfer function, by de-modulating the reconstruction of the OFDM signal.

Many Point-to-Point communication systems, typically used for backhauling, have conflicting operational requirements. Ideally, a Point-to-Point communication system is required to transport data at high rates, over long distances, using minimal power consumption. As data rates and distances go up, so does power consumption. A unique integration of several components is required in order to realize a radio transmitter capable of successfully transporting data at rates of several hundred Mega bits per second, over distances of more than 100 meters, using a transmitter consuming less than 2.5 watts of power. In order to get under 2.5 watts of power consumption, a single Radio Frequency Integrated Circuit (RFIC) that comprises all components of a fully functional transmitter must be used. Included in the components are a Power Amplifier (PA), and a Voltage Controlled Oscillator (VCO) with a synthesizer. However, Radio Frequency Integrated Circuits, such as Silicon-Germanium (SiGe) RFIC comprising high frequency Heterojunction Bipolar Transistors (HBT), are incapable of supporting integrated VCO and synthesizer having a combined phase noise good enough to allow using 64-levels Quadrature-Amplitude-Modulation (64QAM) or 256QAM, which are needed to achieve data rates of over 200 Mbps using a reasonable amount of spectrum at frequencies typically in use for communication. Therefore, in one embodiment, a VCO and synthesizer supporting only 16QAM are integrated into the RFIC, while millimeter-wave bands are used in order to get access to large amounts of spectrum. Continuous and usable channels of over 500 MHz are available at frequencies of 57 GHa to 87 GHz. These frequencies, and other frequencies associated with millimeter-waves, are therefore selected. Radio Frequency Integrated Circuits, such as SiGe RFIC comprising high frequency HBT, are also incapable of supporting integrated PA having a millimeter-wave output exceeding power levels usually associated with high bandwidth communication over long distances. In one embodiment, a PA having a reduced power output is therefore integrated into the RFIC. The reduced power PA operates in conjunction with highly directional antennas, which have reasonable sizes at frequencies associated with millimeter-waves. The highly directional antennas compensate for the reduced power PA. The combination of the above elements is able to achieve a set of requirements that is currently considered impossible.

In one embodiment, an ultra-high-bandwidth low-power-consumption wireless communication system includes (i) a Radio Frequency Integrated Circuit (RFIC) comprising a radio transmitter, transmitting millimeter-wave signals. The radio transmitter includes a Power Amplifier (PA) outputting the millimeter-wave signals at a low power level of between −10 dBm and 20 dBm, and by that allowing inclusion of the PA in the RFIC. The radio transmitter further includes a Voltage Controlled Oscillator (VCO) and a synthesizer driving a mixer up-converting signals into the millimeter-wave signals. The VCO and synthesizer have a combined phase noise between a first level and a second level, wherein the first level is high enough to allow inclusion of the VCO and synthesizer in the RFIC, and the second level is low enough to facilitate transmitting at 16-levels Quadrature-Amplitude-Modulation (16QAM), (ii) a radio receiver receiving the millimeter-wave signals, and (iii) a first directional antenna and a second directional antenna separated by at least 100 meters of line of sight and directed towards each other, together having an aggregated gain of more than 60 dBi, the first directional antenna transmitting the millimeter-wave signals, and the second directional antenna receiving the millimeter-wave signals and feeding the millimeter-wave signals to the radio receiver. The aggregated gain concentrates the low power level of the PA. The radio transmitter and the radio receiver form a millimeter-wave communication link at a bandwidth of at least 100 MHz and 16QAM, over distances of more than 100 meters, resulting in data transfer rate of at least 200 Mbps, while the RFIC, the first directional antenna, and the second directional antenna keep the power consumption of the radio transmitter under 2.5 W.

Figure 8:
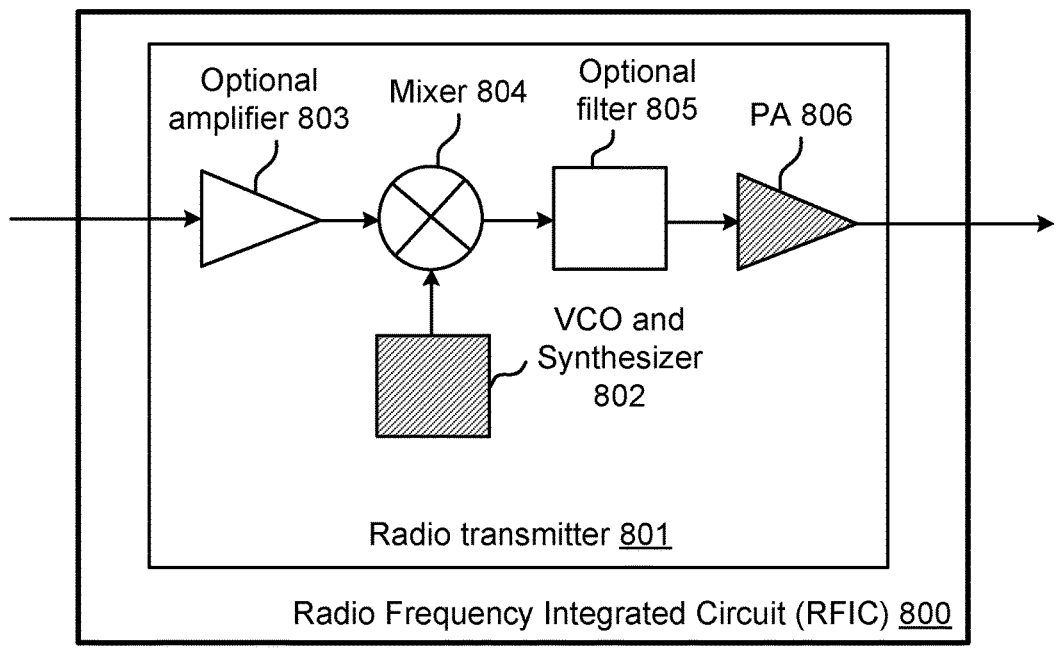
FIG. 8 illustrates one embodiment of a Radio Frequency Integrated Circuit (RFIC) comprising a radio transmitter.

FIG. 8 illustrates one embodiment of a Radio Frequency Integrated Circuit (RFIC) 800 comprising a radio transmitter 801. The radio transmitter 801 includes all components necessary to facilitate a complete radio transmitter design, such as a mixer 804, optionally filters such as filter 805, and optionally amplifiers such as amplifier 803. The radio transmitter 801 includes a Power Amplifier (PA) 806 operative to output a millimeter-wave signals at a low power level of between −10 dBm and 20 dBm. This low power level is low enough to allow integration of the PA 806 inside the RFIC 800, such that a complete radio transmitter design can be facilitated. A VCO and synthesizer 802 drive mixer 804. The mixer 804 is used to generate millimeter wave signals. The VCO and synthesizer 802 have a combined phase noise between a first level and a second level. The first level is high enough to allow integration of the VCO and synthesizer 802 into the RFIC 800. The second level is low enough to facilitate transmitting at 16-levels Quadrature-Amplitude-Modulation (16QAM).

Figure 9A:
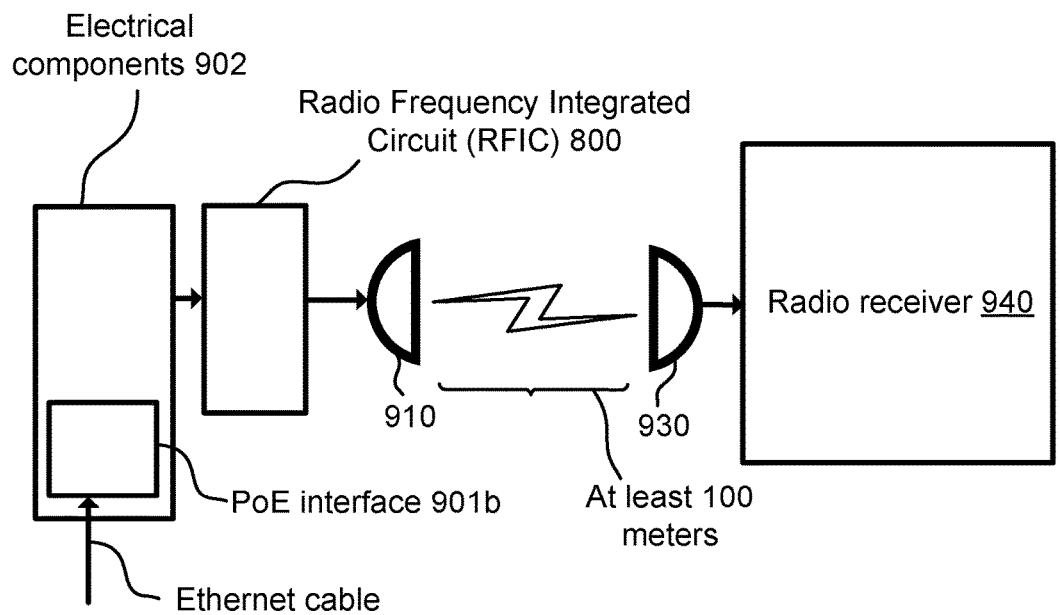
FIG. 9A illustrates one embodiment of a communication system comprising a Radio Frequency Integrated Circuit (RFIC)

FIG. 9A illustrates one embodiment of a communication system. A radio receiver 940 receives the millimeter-wave signals generated by PA 806. A first directional antenna 910 and a second directional antenna 930 are separated by at least 100 meters of line of sight. The first directional antenna 910 and the second directional antenna 930 are directed towards each other, and together have an aggregated gain of more than 60 dBi. The aggregated gain of more than 60 dBi is operative to concentrate the low power level of PA 806, allowing the millimeter-wave signals to better propagate, The first directional antenna 910 transmits the millimeter-wave signals. The second directional antenna receives the millimeter-wave signals, and feeds the millimeter-wave signals to the radio receiver 940. The radio transmitter 801 and the radio receiver 940 form a millimeter-wave communication link at a bandwidth of at least 100 MHz and using 16QAM, over distances of more than 100 meters, resulting in data transfer rate of at least 200 Mbps. RFIC 800 comprising VCO and synthesizer 802, and PA 806, together with the first directional antenna 910 and the second directional antenna 930, keep the power consumption of the radio transmitter 801 under 2.5 W, while achieving the bandwidth of at least 100 MHz, using 16QAM, over distances of more than 100 meters, resulting in data transfer rate of at least 200M. It is noted that bandwidth of at least 100 MHz may be found at frequencies belonging to millimeter waves. It is noted that using bandwidth of less than 100 MHz would have required the use of 64QAM or 256QAM in order to achieve data transfer rate of at least 200M.

In one embodiment, the millimeter-wave signals are located above 20 GHz. In one embodiment, the millimeter-wave signals are located above 50 GHz. In one embodiment, the millimeter-wave signals are located above 57 GHz. In one embodiment, the radio transmitter 801 and the radio receiver 940 form a millimeter-wave communication link at a bandwidth of at least 200 MHz and 16QAM, over distances of more than 100 meters, resulting in data transfer rate of at least 400 Mbps. In one embodiment, the radio transmitter 801 and the radio receiver 940 form a millimeter-wave communication link at a bandwidth of at least 500 MHz and 16QAM, over distances of more than 100 meters, resulting in data transfer rate of at least 1 Gbps.

In one embodiment, the first level high enough to allow inclusion of the VCO and synthesizer 802 in RFIC 800 is −25 dBc. In one embodiment, the millimeter-wave signals convey a baseband Orthogonal Frequency Division Multiplexing (OFDM) signal having sub-carrier frequency separation equal to X MHz, the combined phase noise is measured by integrating twice a combined phase noise density over a range starting at X MHz above a frequency of a carrier and up to the at least 100 Mhz above the frequency of the carrier, and the second level low enough to facilitate transmitting at 16-levels Quadrature-Amplitude-Modulation (16QAM) is −15 dBc. The carrier is the output of the VCO and synthesizer 802 driving mixer 804. According to one example, the carrier has a frequency of 70 Ghz, the baseband Orthogonal Frequency Division Multiplexing (OFDM) signal has a sub-carrier frequency separation equal to 2 MHz, the millimeter-wave communication link has a bandwidth of 200 MHz, and the combined phase noise is two times (twice) the integration of a combined phase noise density of the VCO and synthesizer 802 over the range of 70 GHz+2 MHz to 70 GHz+200 MHz, yielding a combined phase noise below −15 dBc.

In one embodiment, the ultra-high-bandwidth low-power-consumption wireless communication system further includes electrical components 902 comprising a network enabled processor, a modulator, and a Power Over Ethernet (PoE) interface 901*b*. The a Power Over Ethernet (PoE) interface 901*b* is operative to deliver power to the RFIC 800 and the electrical components 902. In one embodiment, the electrical components 902 have a power consumption of under 23 W, such that the aggregated power consumption of the RFIC 800 and the electrical components is under 25.5 W. This may optionally allow using a high power range of the PoE standard. In one embodiment, the electrical components 902 have a power consumption of under 10.45 W, such that the aggregated power consumption of the RFIC 800 and the electrical components 902 is under 12.95 W. This may optionally allow using a mid power range of the PoE standard. In one embodiment, the electrical components 902 have a power consumption of under 3.99 W, such that the aggregated power consumption of the RFIC 800 and the electrical components 902 is under 6.49 W. This may optionally allow using a low power range of the PoE standard.

Figure 9B:
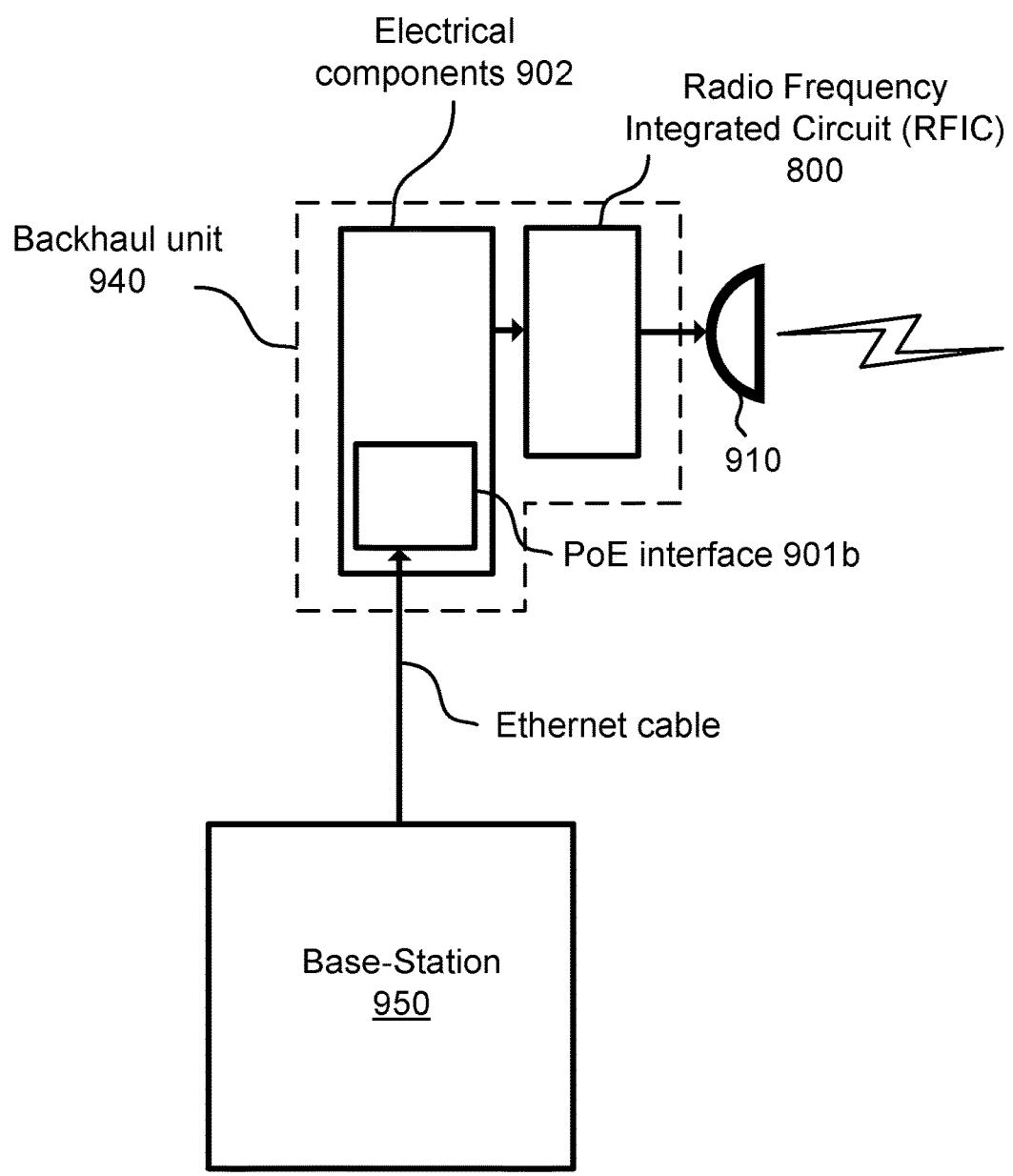
FIG. 9B illustrates one embodiment of a communication system comprising a Radio Frequency Integrated Circuit (RFIC) and a Base-Station.

FIG. 9B illustrates one embodiment of a communication system. Optionally, the ultra-high-bandwidth low-power-consumption wireless communication system further includes a backhaul unit 940 comprising the electrical components 902 and the RFIC 800. The electrical components 902 include the Power Over Ethernet (PoE) interface 901*b*. The PoE interface 901*b* is operative to deliver power to the RFIC 800 and the electrical components 902. Optionally, a Base-Station 950 belonging to a Radio Access Network (RAN) drives the PoE interface 901*b*, and deliver power to the backhaul unit 940. In one embodiment, the RFIC is a Silicon-Germanium (SiGe) RFIC comprising high frequency Heterojunction Bipolar Transistors (HBT). In one embodiment, the RFIC is a CMOS RFIC.

In one embodiment, Power Amplifier (PA) 806 outputs the millimeter-wave signals at a low power level of between −10 dBm and 0 dBm The radio transmitter and the radio receiver form a millimeter-wave communication link at a bandwidth of at least 100 MHz and 16QAM, over distances of more than 50 meters, resulting in data transfer rate of at least 200 Mbps, while the RFIC, the first directional antenna, and the second directional antenna keep the power consumption of the radio transmitter under 1.5 W.

In one embodiment, the first directional antenna 910 and the second directional antenna 930 are directed towards each other, and together have an aggregated gain of more than 80 dBi. Power Amplifier (PA) 806 outputs the millimeter-wave signals at a low power level of between −10 dBm and 0 dBm The radio transmitter and the radio receiver form a millimeter-wave communication link at a bandwidth of at least 100 MHz and 16QAM, over distances of more than 100 meters, resulting in data transfer rate of at least 200 Mbps, while the RFIC, the first directional antenna, and the second directional antenna keep the power consumption of the radio transmitter under 1.5 W.

In one embodiment, the first directional antenna 910 and the second directional antenna 930 are directed towards each other, and together have an aggregated gain of more than 80 dBi. Power Amplifier (PA) 806 outputs the millimeter-wave signals at a low power level of between −10 dBm and 0 dBm The radio transmitter and the radio receiver form a millimeter-wave communication link at a bandwidth of at least 100 MHz and 16QAM, over distances of more than 50 meters, resulting in data transfer rate of at least 200 Mbps, while the RFIC, the first directional antenna, and the second directional antenna keep the power consumption of the radio transmitter under 1 W.

Figure 9C:
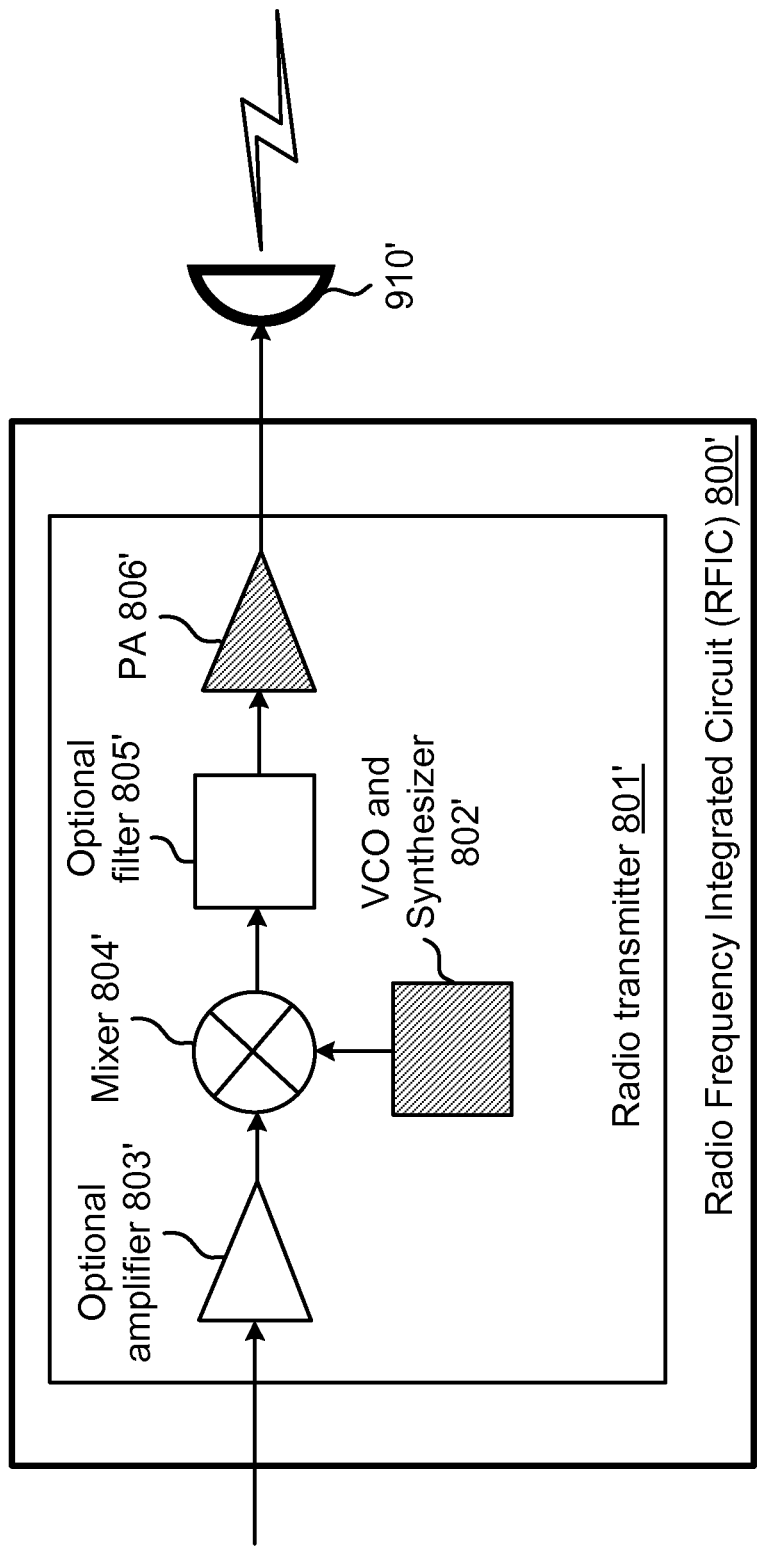
FIG. 9C illustrates one embodiment of a communication system comprising a Radio Frequency Integrated Circuit (RFIC) and a directional antenna.

FIG. 9C illustrates one embodiment of a communication system. The communication system includes (i) a RFIC 800' comprising a radio transmitter 801' transmitting millimeter-wave signals. The radio transmitter 801' includes a PA 806' outputting the millimeter-wave signals at a low power level of between −10 dBm and 20 dBm, and a VCO and a synthesizer 802' driving a mixer 804' up-converting signals into the millimeter-wave signals, and (ii) a first directional antenna 910' having a gain of at least 30 dBi. The radio transmitter 801' and the first directional antenna 910' are configured to transmit the millimeter-wave signals at a level of at least 20 dBmi, using a bandwidth of at least 100 MHz and 16QAM, facilitating data rates of at least 200 Mbps, while the RFIC 800' is configured to keep the power consumption of the radio transmitter 801' under 2.5 W. It is noted that although PA 806' is illustrated as being directly connected to directional antenna 910', PA 806' may also be indirectly connected to directional antenna 910', via a filter or a power splitter, or via any other appropriate component.

In one embodiment, the VCO and synthesizer 802' have a combined phase noise between a first level and a second level, wherein the first level is high enough to allow inclusion of the VCO and synthesizer 802' in the RFIC 800', and the second level is low enough to facilitate transmitting at 16-levels Quadrature-Amplitude-Modulation (16QAM). In one embodiment, the first level high enough to allow inclusion of the VCO and synthesizer 802' in the RFIC 800' is −25 dBc.

In one embodiment, the millimeter-wave signals convey a baseband Orthogonal Frequency Division Multiplexing (OFDM) signal having sub-carrier frequency separation equal to X MHz, the combined phase noise is measured by integrating twice a combined phase noise density over a range starting at X MHz above a frequency of a carrier and up to the at least 100 Mhz above the frequency of the carrier, and the second level low enough to facilitate transmitting at 16-levels Quadrature-Amplitude-Modulation (16QAM) is −15 dBc. In one embodiment, the low power level of PA 806' allows inclusion of PA 806' in the RFIC 800'. In one embodiment, the radio transmitter 801' and the first directional antenna 910' are configured to transmit the millimeter-wave signals at a level of at least 20 dBmi, using a bandwidth of at least 500 MHz and 16QAM, facilitating data rates of at least 1 Gbps. In one embodiment, the radio transmitter 801' and the first directional antenna 910' are configured to transmit the millimeter-wave signals at a level of at least 20 dBmi, using a bandwidth of at least 500 MHz, facilitating data rates of at least 500 Mbps.

As used herein, "gain", or "communication gain", is a parameter which measures the degree of directivity of the antenna's radiation pattern. It is typically measured in the number of isotropic decibels, or dBi. Generally, a higher dBi is associated with a greater concentration of radiated energy in a particular direction.

As used herein, "communication system" means a radio transceiver.

As used herein, "antenna system" is the structure of a waveguide on an electrically-conductive lamina such that the radiated energy is shaped to increase the communication gain.

As used herein a "communication network" means two or more radio transceivers that are in communicative contact.

Figure 11A:
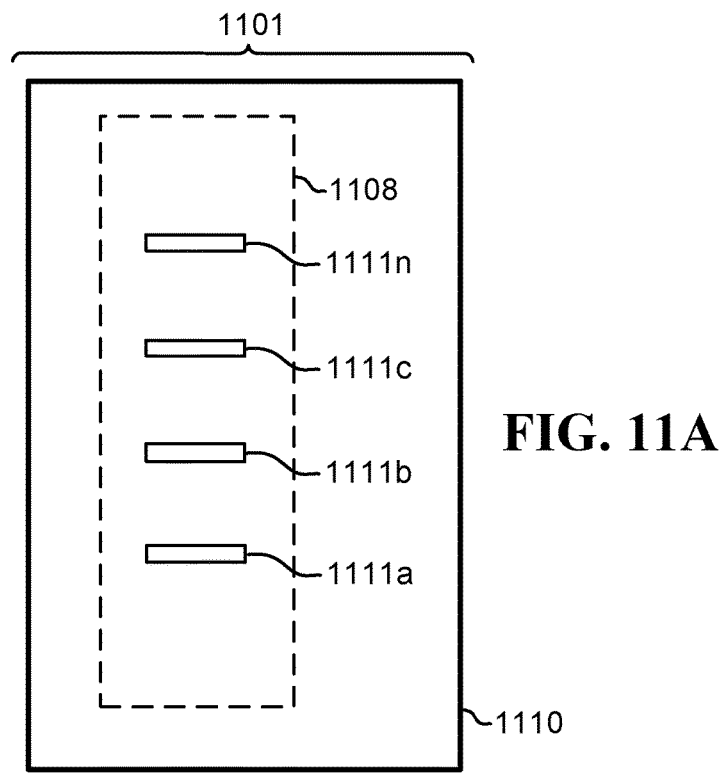
FIG. 11A illustrates one embodiment, in top-down view, of an antenna system that is part of a millimeter-wave communication network, in which multiple slots have been cut accurately onto an electrically-conducive lamina.

FIG. 11A illustrates, in top-down view, one embodiment of an antenna system that is part of a millimeter-wave communication network, in which multiple slots have been cut accurately onto an electrically-conducive lamina. FIG. 11A shows a slotted wave-guide 1101 configured to transport millimeter-waves. An electrically-conductive metal cover 1108 is mounted on an electrically-conductive lamina 1110, where the lamina 1110 is cut accurately such that there are multiple separate slots, 1111a, 1111b, 1111c, and 1111n, through which electrical magnetic energy may be radiated. FIG. 11A shows four slots, although it will be understand that there may be two slots, or any number of slots greater than two.

Figure 11B:
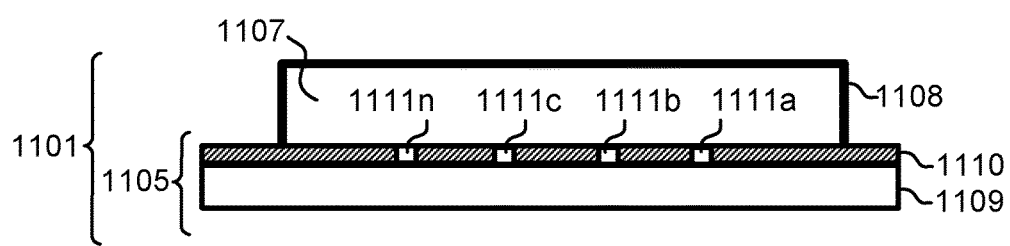
FIG. 11B illustrates one embodiment, in a side view, of an antenna system that is part of a millimeter-wave communication network, in which multiple slots have been cut accurately onto an electrically-conductive lamina, and in which there is depicted also an electrically-conductive metal cover mounted on the electrically-conductive lamina.

FIG. 11B illustrates, in a side view, one embodiment of an antenna system that is part of a millimeter-wave communication network, in which multiple slots have been cut accurately onto an electrically-conducive lamina. FIG. 12B contains all of the same elements, in the same structure and fulfilling the same functions, as the elements shown in FIG. 11A. In addition, FIG. 12B shows a printed circuit board 1105 which is comprised of the electrically-conductive lamina 1110 mounted on a substrate lamina 1109. The electrically-conductive metal cover 1108 is shown, and in combination with the other elements the cover 1108 creates an enclosed wave-guide cavity 1107.

Figure 11C:
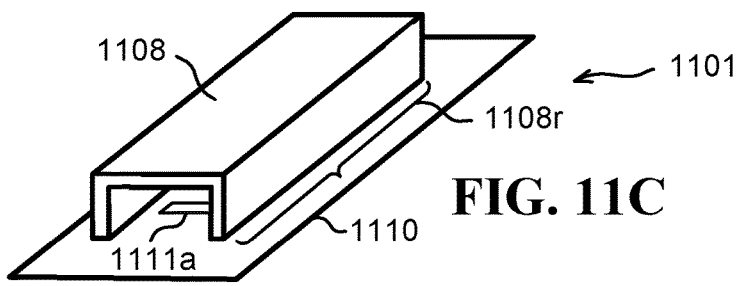
FIG. 11C illustrates one embodiment of an antenna system that is part of a millimeter-wave communication network, in which multiple slots have been cut accurately onto an electrically-conducive lamina, and in which there is depicted also an electrically-conductive metal cover mounted on the electrically-conductive lamina.

FIG. 11C illustrates one embodiment of an antenna system that is part of a millimeter-wave communication network, in which multiple slots have been cut accurately onto an electrically-conducive lamina, and in which there is depicted also an electrically-conductive metal cover mounted on the electrically-conductive lamina. FIG. 11C shows some of the elements discussed already in regard to FIG. 11A and FIG. 11B. Both the structure and the function of these previously shown elements are the same as shown in FIG. 11A and FIG. 11B. In addition, FIG. 11C shows that the electrically-conductive metal cover 1108 has been bent, molded, or machined into a structure having a U-like cross-section, such that at least one rail 1108r is formed along the side of the cover 1108, and the contact between the cover 1108 and the lamina 1109 creates an electromagnetic seal of the wave-guide cavity 1107.

Figure 11D:
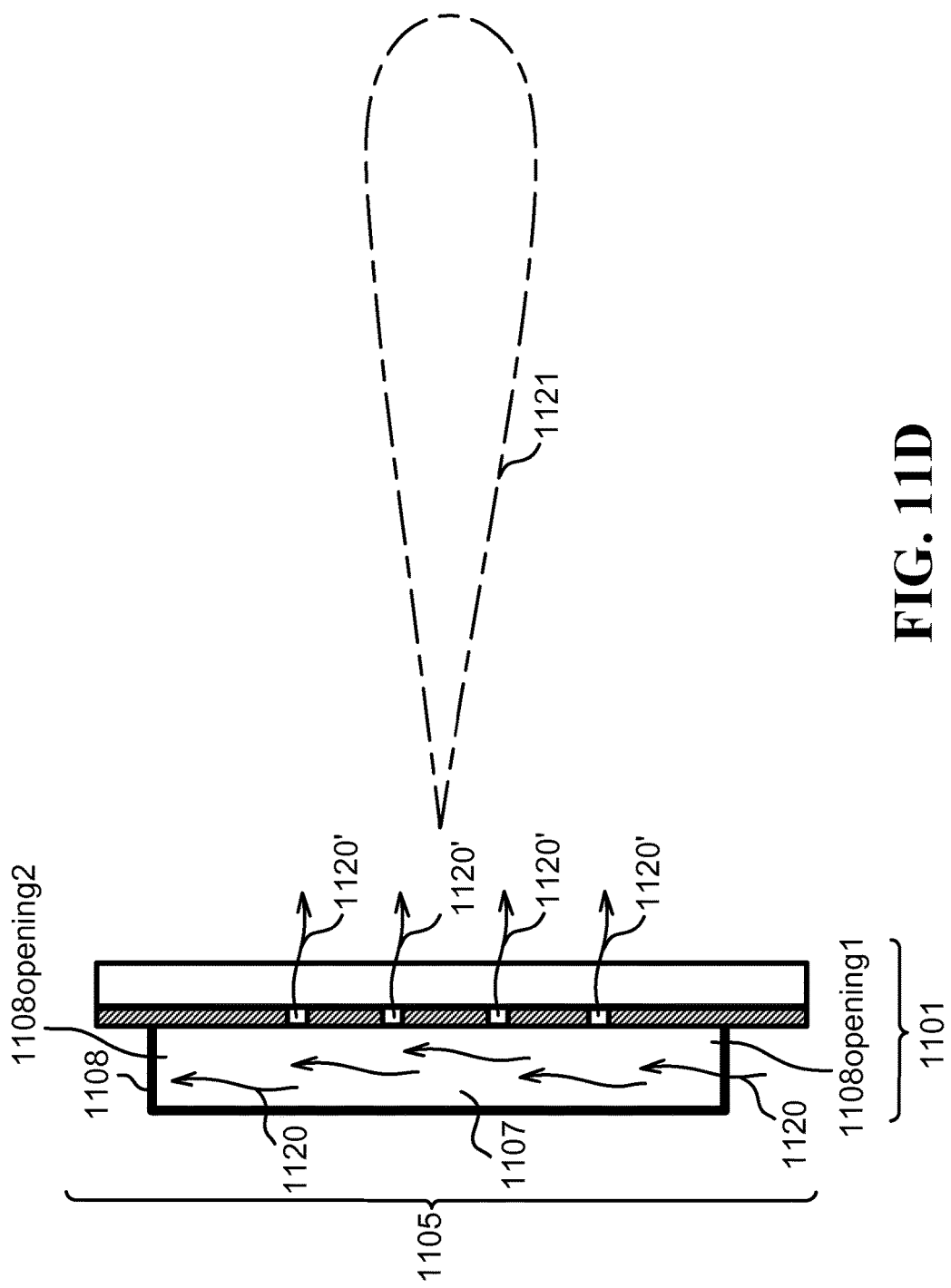
FIG. 11D illustrates one embodiment, in a side view, of an antenna system that is part of a millimeter-wave communication network, in which multiple slots have been cut accurately onto an electrically-conducive lamina, wherein there is depicted also the flow of electrical magnetic energy into the antenna system and a resulting radiation propagation pattern.

FIG. 11D illustrates, in a side view, one embodiment of an antenna system that is part of a millimeter-wave communication network, in which multiple slots have been cut accurately onto an electrically-conducive lamina, wherein there is depicted also the flow of electrical magnetic energy into the antenna system and a resulting radiation propagation pattern. FIG. 11D shows some of the elements discussed already in regard to FIGS. 11A-11C. Both the structure and the function of these previously shown elements are the same as shown in FIGS. 11A-11C. In addition, FIG. 11D shows that the metal cover 1108 has been formed in such a way that there is at least one opening for a source of electromagnetic energy 1108 opening 1 and possibly another opening 1108 opening 2. The direction of electromagnetic energy is depicted by millimeter-waves 1120, which is from the first opening 1108 opening 1 through the cavity 1107 to the second opening 1108 opening 2. The millimeter-waves 1120 propagating in the cavity 1107 are guided over the slots in the lamina 1110, thereby radiating millimeter-waves 1120' via said slots, thereby forming a predetermined millimeter-wave radiation pattern 1121. FIG. 11D shows four slots, which are not numbered, but which are elements 1111a, 1111b, 1111c, and 1111n. The number of such slots may be two or higher.

Figure 12A:
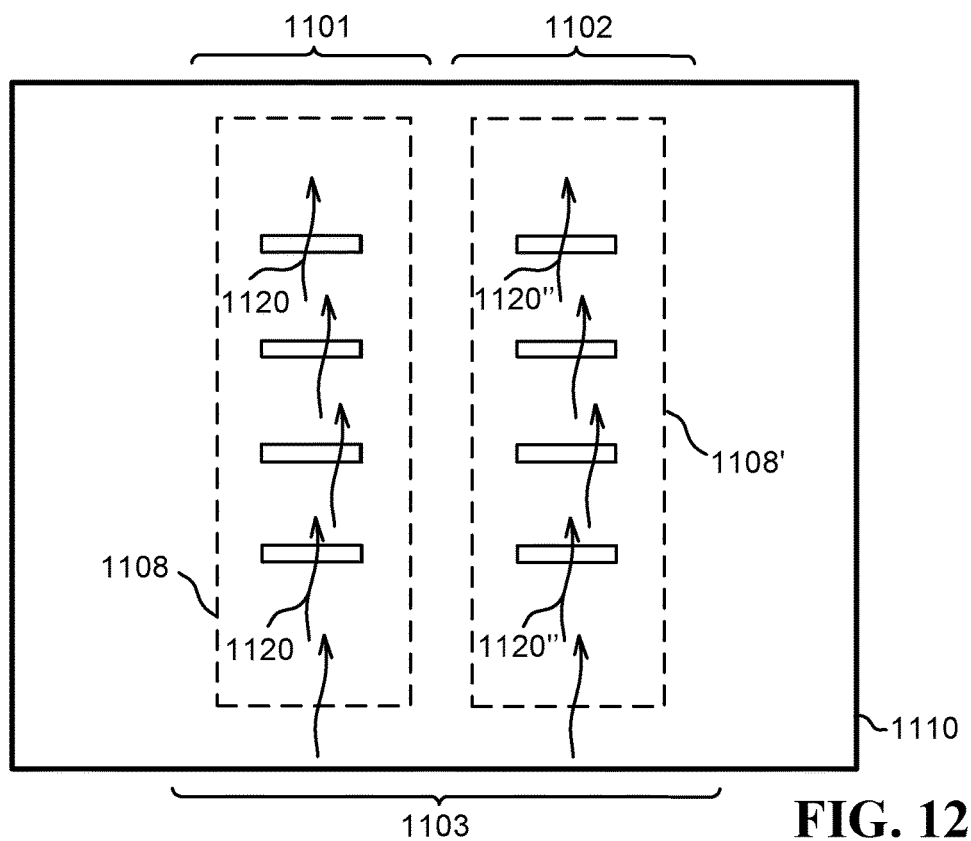
FIG. 12A illustrates one embodiment, in a top-down view, of an antenna system that is part of a millimeter-wave communication network, in which multiple slots have been cut accurately onto a single electrically-conducive lamina, wherein some slots are configured to form a first wave-guide whereas other slots are configured to form a second wave-guide, wherein an electrically-conductive metal cover is mounted on the electrically-conductive lamina above each of the wave-guides, and wherein there is depicted also the flow of electromagnetic energy through each slotted wave-guide.
Figure 12B:
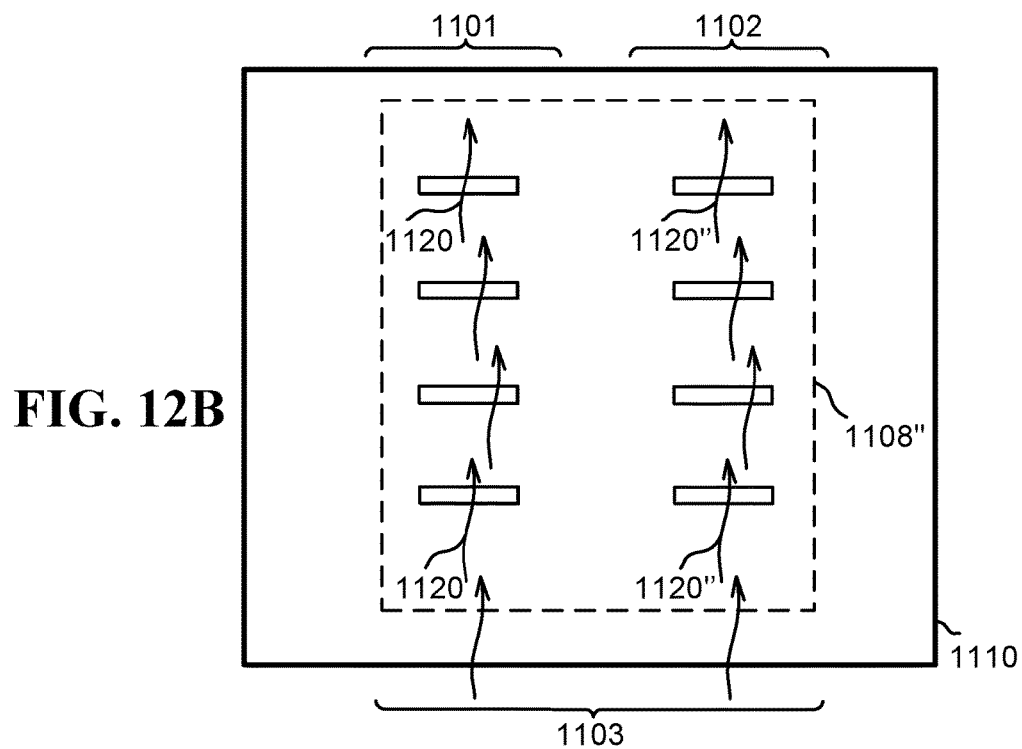
FIG. 12B illustrates one embodiment, in a top-down view, of an antenna system that is part of a millimeter-wave communication network, in which multiple slots have been cut accurately onto an electrically-conductive lamina, wherein some slots are configured to form a first wave-guide whereas other slots are configured to form a second wave-guide, wherein a single electrically-conductive metal cover is mounted on the electrically-conductive lamina over both of the slotted wave-guides, and wherein there is depicted also the flow of electrical magnetic energy into the antenna system.

FIG. 12A illustrates, in a top-down view, one embodiment of an antenna system that is part of a millimeter-wave communication network, in which multiple slots have been cut accurately onto a single electrically-conducive lamina, wherein some slots are configured to form a first wave-guide whereas other slots are configured to form a second wave-guide, wherein an electrically-conductive metal cover is mounted on the electrically-conductive lamina above each of the wave-guides, and wherein there is depicted also the flow of electromagnetic energy through each slotted wave-guide. FIG. 12A shows two wave-guides, 1101 and 1102, each of which has its own enclosing cover, where 1101 is enclosed by electrically-conductive metal cover 1108, and 1102 is enclosed by electrically-conductive metal cover 1108'. Electromagnetic energy flows through the wave-guides, in which such energy flows as millimeter-waves 1120 through wave-guide 1101 and as millimeter-waves 1120" through waveguide 1102. The two wave-guides 1101 and 1102 form a two-dimensional radiating slot structure 1103. In one embodiment, the two wave-guides 1101 and 1102 are placed side by side, but other configurations are possible. The millimeter-waves 1120 and 1120" propagating through the two wave-guides form an accurate high gain millimeter-wave radiation pattern shown as 1122 in FIG. 12C. FIG. 12A shows two wave-guides 1101 and 1102, but it will be understood that the number of wave-guides in alternative embodiments may be three or more.

FIG. 12B illustrates, in a top-down view, one embodiment of an antenna system that is part of a millimeter-wave communication network, in which multiple slots have been cut accurately onto an electrically-conducive lamina, wherein some slots are configured to form a first wave-guide whereas other slots are configured to form a second wave-guide, wherein a single electrically-conductive metal cover is mounted on the electrically-conductive lamina over both of the slotted wave-guides, and wherein there is depicted also the flow of electrical magnetic energy into the antenna system. FIG. 12B shows a two-dimensional slot structure 1103 that is different from the slot structure in FIG. 12A in that there is only a single electrically-conductive metal cover 1108" that encloses both wave-guide 1101 and wave-guide 1102. FIG. 12B shows two wave-guides 1101 and 1102, but it will be understand that the number of wave-guides in alternative embodiments may be three or more, provide that there is a single electrically-conductive metal cover 1108" enclosing all of the wave-guides.

Figure 12C:
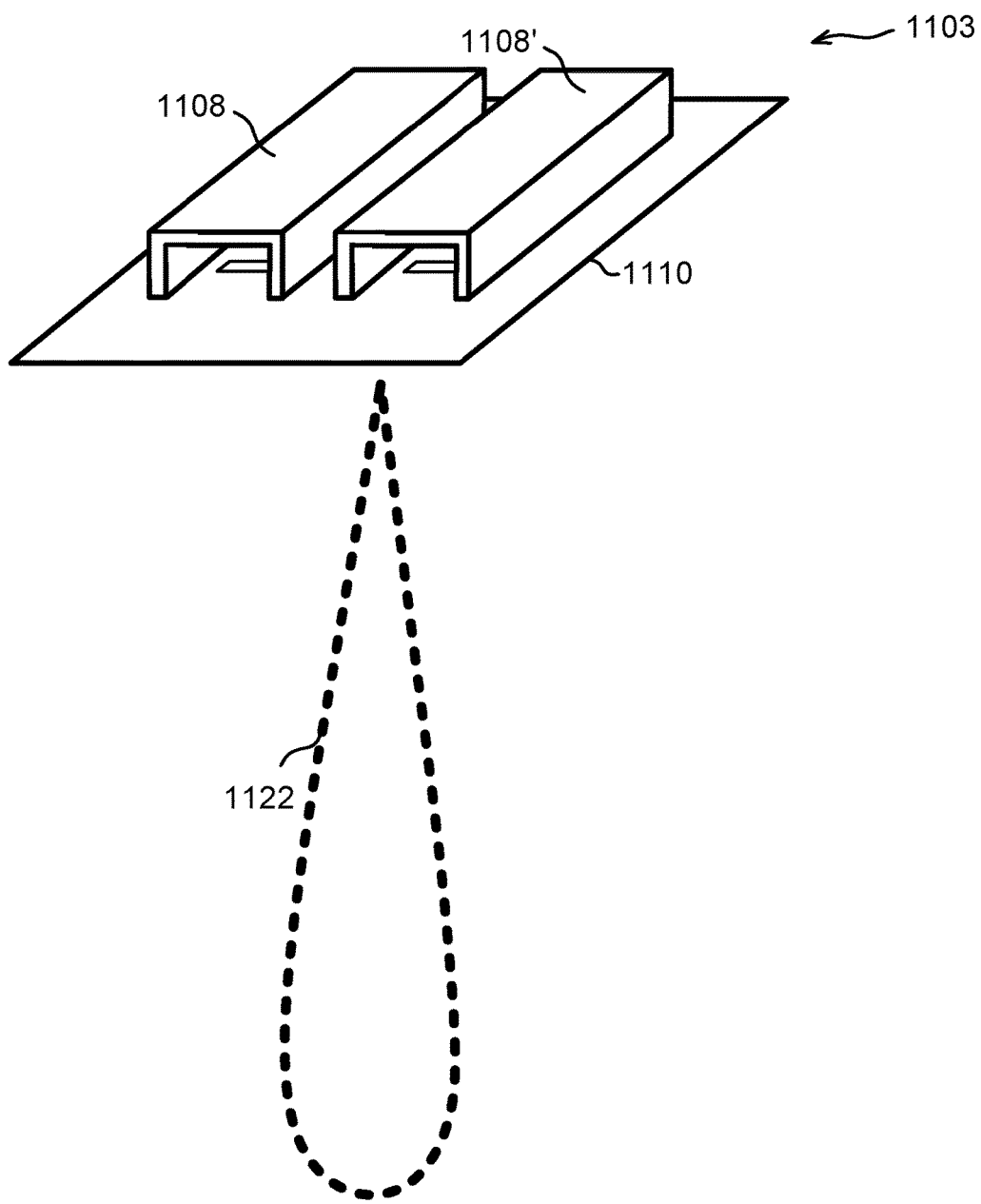
FIG. 12C illustrates one embodiment of an antenna system that is part of a millimeter-wave communication network, in which multiple slots have been cut accurately onto a single electrically-conducive lamina, wherein some slots are configured to form a first wave-guide whereas other slots are configured to form a second wave-guide, wherein an electrically-conductive metal cover is mounted on the electrically-conductive lamina above each of the wave-guides, and wherein there is depicted a resulting radiation propagation pattern.

FIG. 12C illustrates one embodiment of an antenna system that is part of a millimeter-wave communication network, in which multiple slots have been cut accurately onto a single electrically-conducive lamina, wherein some slots are configured to form a first wave-guide whereas other slots are configured to form a second wave-guide, wherein an electrically-conductive metal cover is mounted on the electrically-conductive lamina above each of the wave-guides, and wherein there is depicted a resulting radiation propagation pattern. FIG. 12C is an alternative view of the structure presented and discussed in FIG. 12A. FIG. 12C shows elements 1108, 1108', 1103, and 1110, which are structured and perform the same functions as those elements are shown and discussed in FIG. 12A. FIG. 12C shows millimeter-wave radiation pattern 1122, which is produced by the structure shown in FIG. 12A and also in FIG. 12C, and which is a very accurate high-gain radiation pattern.

It will be understood that FIG. 12C shows an antenna system with two wave-guides, but in alternative embodiments there may be three or more wave-guides, each with its own electrically-conductive metal cover. In some configurations, an increase in the number of wave-guides will increase the communication gain. It will be understood that FIG. 12C shows two wave-guides in which each wave-guide has its own electrically-conductive metal cover, but in alternative embodiments there may be a single metal cover enclosing all of the wave-guides, and the number of wave-guides may be two or more. Radiated pattern 1122 may be produced also by an alternative structure in which all of the wave-guides are enclosed by a single structure. Further, it will be understood that if there are three or more wave-guides, each wave-guide may have its own metal cover, or all of the wave-guides may share a single metal cover, or there may be some wave-guides with their own metal covers while other wave-guides share a metal cover. In some configurations, an increase in the number of wave-guides will increase the communication gain, regardless of whether individual wave-guides have their own or shared metal covers.

Figure 13:
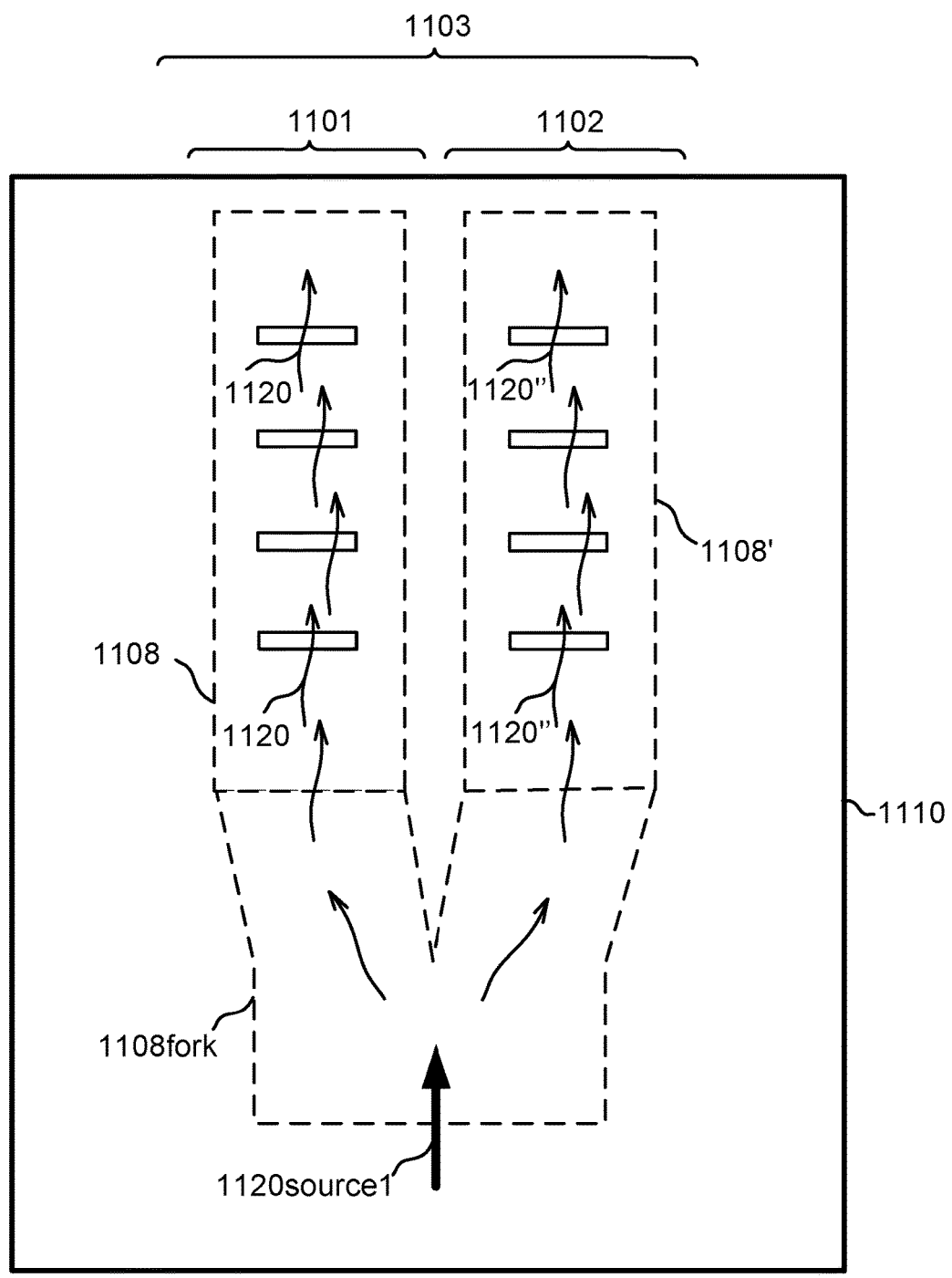
FIG. 13 illustrates one embodiment, in a top-down view, of an antenna system that is part of a millimeter-wave communication network, in which multiple slots have been cut accurately onto an electrically-conducive lamina, wherein some slots are configured to form a first wave-guide whereas other slots are configured to form a second wave-guide, wherein an electrically-conductive metal cover is mounted on the electrically-conductive lamina above each of the wave-guides, and wherein there is depicted also the flow of electromagnetic energy through the slotted wave-guides; there is depicted also one source of electromagnetic energy, in which there is a fork structure that splits the energy, directing part of the energy to one slotted wave-guide and part of the energy to the other slotted wave-guide.

FIG. 13 illustrates, in a top-down view, one embodiment of an antenna system that is part of a millimeter-wave communication network, in which multiple slots have been cut accurately onto an electrically-conducive lamina, wherein some slots are configured to form a first wave-guide whereas other slots are configured to form a second wave-guide, wherein an electrically-conductive metal cover is mounted on the electrically-conductive lamina above each of the wave-guides, and wherein there is depicted also the flow of electromagnetic energy through the slotted wave-guides. There is depicted also one source of electromagnetic energy, in which there is a fork structure that splits the energy, directing part of the energy to one slotted wave-guide and part of the energy to the other slotted wave-guide. In FIG. 13, in contrast to FIGS. 12A, 12B, and 12C, there is a single source of electromagnetic energy 1120 source 1, and this single source of energy 1120 source 1 is connected to both the first 1101 and the second 1102 slotted wave-guides, via a wave-guide fork 1108 fork. It will be understood that FIG. 13 shows two slotted wave-guides, but the number of slotted wave-guides sharing a single source of energy 1120 source 1 may also be three or more.

Figure 14:
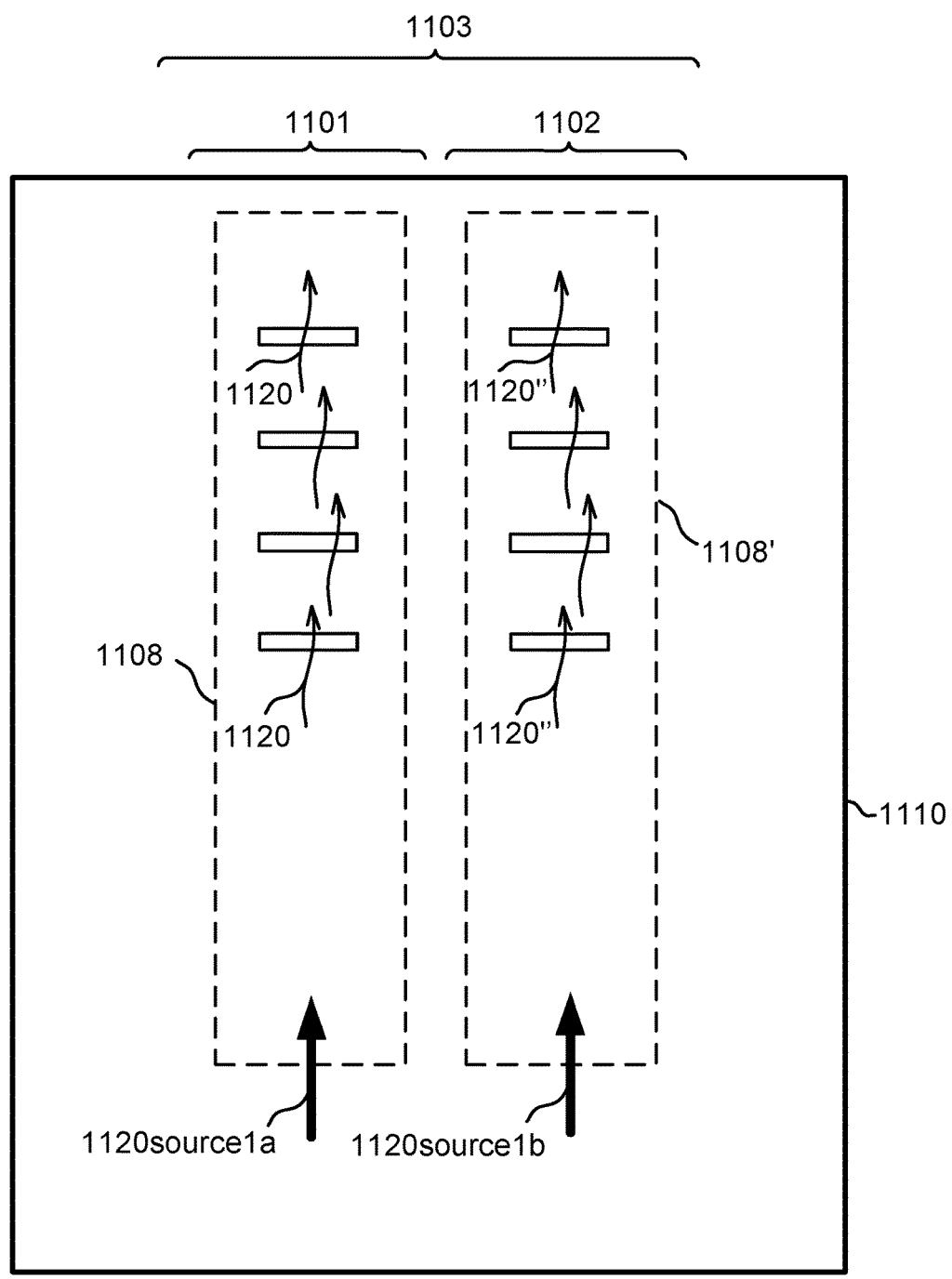
FIG. 14 illustrates one embodiment, in a top-down view, of an antenna system that is part of a millimeter-wave communication network, in which multiple slots have been cut accurately onto an electrically-conducive lamina, wherein some slots are configured to form a first wave-guide whereas other slots are configured to form a second wave-guide, wherein an electrically-conductive metal cover is mounted on the electrically-conductive lamina above each of the wave-guides, and wherein there is depicted also the flow of electromagnetic energy through the slotted wave-guides; there are depicted also two sources of electrical magnetic energy, in which one source of energy directs its energy to the first slotted wave-guide and the second source of energy directs its energy to the second slotted wave-guide.

FIG. 14 illustrates, in a top-down view, one embodiment of an antenna system that is part of a millimeter-wave communication network, in which multiple slots have been cut accurately onto an electrically-conducive lamina, wherein some slots are configured to form a first wave-guide whereas other slots are configured to form a second wave-guide, wherein an electrically-conductive metal cover is mounted on the electrically-conductive lamina above each of the wave-guides, and wherein there is depicted also the flow of electromagnetic energy through the slotted wave-guides. There are depicted also two sources of electromagnetic energy, in which one source of energy directs its energy to the first slotted wave-guide and the second source of energy directs its energy to the second slotted wave-guide. FIG. 14 depicts multiple sources of energy, in which each source supplies a single slotted wave-guide. The scheme of energy sources depicted in FIG. 14 contrasts with the single-source of energy depicted in FIG. 13. As shown in FIG. 14, 1120 source 1*a* is the source of electromagnetic energy for slotted wave-guide 1101, whereas 1120 source 1*gb* is the source of electromagnetic energy for slotted wave-guide 1102. Using multiples sources of electromagnetic energy, it is possible to vary the phase and strength of the various sources in such a manner to alter the direction of resulting radiation patterns. Such variation may be done dynamically in response to changing communication conditions, or according to some pre-determined schedule, or by specific decision.

One embodiment is a millimeter-wave antenna system. In one embodiment, there is a slotted wave-guide 1101 configured to transport millimeter-waves. The wave-guide 1101 comprises a printed-circuit-board 1105 comprised of an electrically-conductive lamina 1110 mounted on a substrate lamina 1109, where the lamina 1110 is cut accurately with at least two separate slots 1111*a* and 1111*b*, although there may be any additional number of slots beyond two. The system includes also an electrically-conductive metal cover 1108 mounted on the electrically-conductive lamina 1110, such that an enclosed wave-guide cavity 1107 is formed above said the separate slots 1111*a* and 1111*b*, thereby forming the slotted wave-guide 1101. Further, the slotted wave-guide 1101 is configured to guide millimeter-waves 1120 over the separate slots 1111*a* and 1111*b*, thereby radiating millimeter-waves 1120' via said at least two separate slots 1111*a* and 1111*b*, thereby forming a predetermined millimeter-wave radiation pattern 1121.

In a first alternative embodiment to the millimeter-wave antenna system just described, the system includes also a second slotted wave-guide 1102 configured to transport millimeter-waves 1120" alongside the first slotted wave-guide 1101, thereby forming, together with the first slotted wave-guide 1101, a two-dimensional radiating slot structure 1103, configured to form an accurate high-gain millimeter-wave radiation pattern 1122.

In a first variation to the first alternative embodiment just described, the accurate high-gain millimeter-wave radiation pattern 1122 has a gain above 9 dBi.

In a first configuration to the first variation just described, the accuracy of the accurate high-gain millimeter-wave radiation pattern 1122 is better than one dB.

In a second configuration to the first variation just described, the two-dimensional radiating slot structure 1103 includes at least 16 slots, resulting in an accurate high-gain millimeter-wave pattern 1122 having a gain above 15 dBi.

In a first possible implementation of the second configuration just described, the two-dimensional radiating slot structure 1103 includes at least 128 slots, resulting in an accurate high-gain millimeter-wave pattern 1122 having a gain above 24 dBi.

In a second variation to the first alternative embodiment described above, the first 1101 and second 1102 slotted wave-guides are injected with millimeter-waves using a single millimeter-wave radiating source 1120 source 1.

In a first configuration to the second variation just described, the single millimeter-wave radiating source 1120 source 1 is connected to the first 1101 and second 1102 slotted wave-guides via a wave-guide fork 1108 fork.

In a third variation to the first alternative embodiment described above, the first 1101 and second 1102 slotted wave-guides are injected with millimeter-waves using, respectively, first 1120 source 1*a* and second 1120 source 1*b* radiating sources.

In a first configuration to the third variation just described, a phase difference between first 1120 source 1*a* and second 1120 source 1*b* radiating sources is controlled, thereby controlling a direction toward which the accurate high-gain millimeter-wave radiation patter 1122 radiates.

In a second alternative embodiment to the millimeter-wave antenna system described above, the at least two separate slots 1111*a* and 1111*b* are cut to an accuracy of at least 25 micrometers, thereby facilitating an accuracy that is sufficient for manipulating millimeter-waves.

In a first variation to the second alternative embodiment just described, the accuracy is achieved using a laser cutting technique.

In a second variation to the second alternative embodiment described above, the accuracy is achieved using a punching technique.

In a third variation to the second alternative embodiment described above, the accuracy is achieved using a wire-cutting technique.

In a fourth variation to the second alternative embodiment described above, the accuracy is achieved using a printed-circuit-board-etching technique.

In a third alternative embodiment to the millimeter-wave antenna system described above, the accurate millimeter-wave radiation pattern 1122 has a gain above 6 dBi.

In a first variation to the third alternative embodiment just described, the accuracy of the millimeter-wave radiation pattern 1122 is better than one dB.

In a fourth alternative embodiment to the millimeter-wave antenna system described above, the electrically-conductive lamina 1110 is printed on the substrate lamina 1109, thereby forming the printed-circuit-board 1105.

In a fifth alternative embodiment to the millimeter-wave antenna system described above, the electrically-conductive metal cover 1108 is bent, molded, or machined into a structure having a substantially "U" shaped cross-section, such that at least one rail 1108*r* is formed between the metal cover 1108 and the electrically-conductive lamina 1110. The rail 1108*r* seals electromagnetically the cavity 1107 of the first slotted wave-guide 1101, such that two openings are formed, one opening 1108 opening 1 at one end of the electrically-conductive metal cover 1108, and another opening 1108 opening 2 at the other end of the electrically-conductive metal cover 1108. Also in this fifth alternative embodiment, the millimeter-waves are injected into the first slotted wave-guide 1101 via opening 1108 opening 1. Also in this fifth alternative embodiment, the at least two separate slots 1111*a* and 1111*b* are located one after the other along the length of the first slotted wave-guide 1101, such that the millimeter-waves pass over one of the at least two separate slots 1111*a* and 1111*b*, and then pass over another of the at least two separate slots 1111*a* and 1111*b*, on their way from the one opening 1108 opening 1 to the other opening 1108 opening 2 of the first slotted wave-guide 1101.

In a first variation of the fifth alternative embodiment just described, the at least two separate slots 1111a and 1111b have identical dimensions.

In a first configuration of the first variation just described, the second opening 1108 opening 2 of the first slotted wave-guide 1101 is sealed electromagnetically, such that the millimeter-waves injected into the wave-guide 1101 reflect back toward the first opening 1108 opening 1, thereby passing over each of the at least two separate slots 1111a and 1111b at least twice.

In a first possible implementation of the first configuration just described, the millimeter-waves inside the first slotted wave-guide 1101 are standing-waves.

In a second variation of the fifth alternative embodiment described above, one of the at least two separate slots 1111a and 1111b has smaller dimensions than the other of the at least two separate slots 1111a and 1111b, thereby compensating for attenuation of the millimeter-waves as they propagate along the first slotted wave-guide 1101.

In a sixth alternative embodiment to the millimeter-wave antenna system described above, the slots 1111a and 1111b form a two-dimensional array.

In a seventh alternative embodiment to the millimeter-wave antenna system described above, at least one of the slots 1111a and 1111b is configured to control the phase of the millimeter-wave by interacting with at least one electrical component on the printed-circuit-board 1105.

Figure 10:
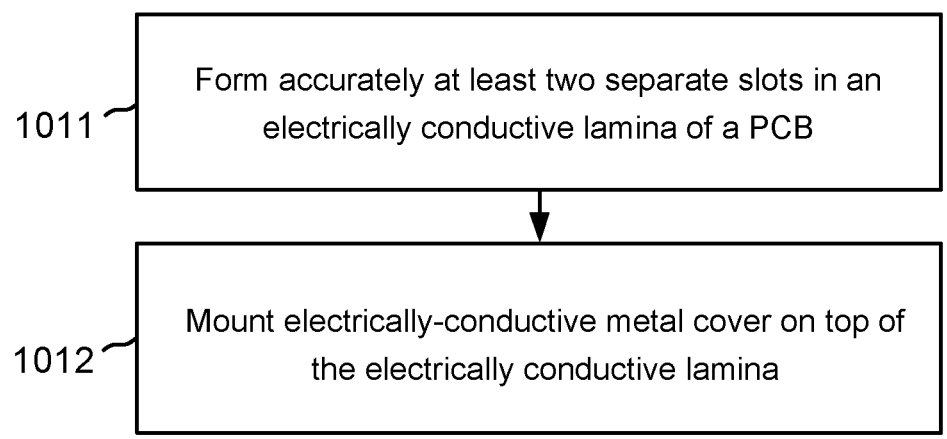
FIG. 10 illustrates one embodiment of a flow diagram describing one method for the manufacturing of an antenna system that is part of a millimeter-wave communication network, wherein the antenna system is configured to improve communication gain in the system.

FIG. 10 illustrates one embodiment of a method for producing a millimeter-wave antenna system. In step 1011, at least two separate slots in an electrically-conductive lamina of a printed-circuit-board are formed in such a manner that the separate slots are configured to radiate millimeter-waves, and the separate slots are located in respect to one other such as to facilitate synthesis of an accurate millimeter-wave radiation pattern. In step 1012, there is mounted on top of the electrically-conductive lamina an electrically-conductive metal cover, such that an enclosed wave-guide cavity is formed above the separate slots, thereby forming a slotted wave-guide configured to function as a millimeter-wave antenna system.

In a first alternative embodiment to the method for producing an antenna system just described, the separate slots are formed to an accuracy of at least 25 micrometers.

In a first variation to the first alternative embodiment just described, the accuracy is achieved using a laser cutting technique.

In a second variation to the first alternative embodiment just described, the accuracy is achieved using a punching technique.

In a third variation to the first alternative embodiment just described, the accuracy is achieved using a wire-cutting technique.

In a fourth variation to the first alternative embodiment just described, the accuracy is achieved using a circuit-board etching technique.

In a second alternative embodiment to the method for producing an antenna system described above, the separate slots are located substantially one wavelength of said millimeter-waves away from each other.

In a third alternative embodiment to the method for producing an antenna system described above, the method also includes forming accurately, alongside the separate slots, at least two additional separate slots in the electrically-conductive lamina of said printed-circuit-board, such that the at least two additional separate slots are configured to radiate millimeter-waves, and the at least two additional separate slots are located in respect to each other and in respect to said two separate slots such as to facilitate synthesis of an accurate high gain millimeter-wave radiation pattern. Also in this third alternative embodiment, there is mounted on top of said electrically-conductive lamina, a second electrically-conductive metal cover that encloses a second wave-guide cavity above said at least two additional separate slots, thereby forming a two-dimensional radiating slot structure configured to form an accurate high gain millimeter-wave radiation pattern.

In this description, numerous specific details are set forth. However, the embodiments/cases of the invention may be practiced without some of these specific details. In other instances, well-known hardware, materials, structures and techniques have not been shown in detail in order not to obscure the understanding of this description. In this description, references to "one embodiment" and "one case" mean that the feature being referred to may be included in at least one embodiment/case of the invention. Moreover, separate references to "one embodiment", "some embodiments", "one case", or "some cases" in this description do not necessarily refer to the same embodiment/case. Illustrated embodiments/cases are not mutually exclusive, unless so stated and except as will be readily apparent to those of ordinary skill in the art. Thus, the invention may include any variety of combinations and/or integrations of the features of the embodiments/cases described herein. Also herein, flow diagrams illustrate non-limiting embodiment/case examples of the methods, and block diagrams illustrate non-limiting embodiment/case examples of the devices. Some operations in the flow diagrams may be described with reference to the embodiments/cases illustrated by the block diagrams. However, the methods of the flow diagrams could be performed by embodiments/cases of the invention other than those discussed with reference to the block diagrams, and embodiments/cases discussed with reference to the block diagrams could perform operations different from those discussed with reference to the flow diagrams. Moreover, although the flow diagrams may depict serial operations, certain embodiments/cases could perform certain operations in parallel and/or in different orders from those depicted. Moreover, the use of repeated reference numerals and/or letters in the text and/or drawings is for the purpose of simplicity and clarity and does not in itself dictate a relationship between the various embodiments/cases and/or configurations discussed. Furthermore, methods and mechanisms of the embodiments/cases will sometimes be described in singular form for clarity. However, some embodiments/cases may include multiple iterations of a method or multiple instantiations of a mechanism unless noted otherwise. For example, when a controller or an interface are disclosed in an embodiment/case, the scope of the embodiment/case is intended to also cover the use of multiple controllers or interfaces.

Certain features of the embodiments/cases, which may have been, for clarity, described in the context of separate embodiments/cases, may also be provided in various combinations in a single embodiment/case. Conversely, various features of the embodiments/cases, which may have been, for brevity, described in the context of a single embodiment/case, may also be provided separately or in any suitable sub-combination. The embodiments/cases are not limited in their applications to the details of the order or sequence of steps of operation of methods, or to details of implementation of devices, set in the description, drawings, or examples. In addition, individual blocks illustrated in the figures may be functional in nature and do not necessarily correspond to discrete hardware elements. While the methods disclosed herein have been described and shown with reference to particular steps performed in a particular order, it is understood that these steps may be combined, sub-divided, or reordered to form an equivalent method without departing from the teachings of the embodiments/cases. Accordingly, unless specifically indicated herein, the order and grouping of the steps is not a limitation of the embodiments/cases. Embodiments/cases described in conjunction with specific examples are presented by way of example, and not limitation. Moreover, it is evident that many alternatives, modifications and variations will be apparent to those skilled in the art. Accordingly, it is intended to embrace all such alternatives, modifications and variations that fall within the spirit and scope of the appended claims and their equivalents.

What is claimed is:

1. A millimeter-wave antenna system comprising:
a first slotted wave-guide operative to transport millimeter-waves comprising:
(i) a printed-circuit-board comprising an electrically-conductive lamina mounted on a substrate lamina, said electrically-conductive lamina is cut with at least two separate slots; and
(ii) an electrically-conductive metal cover mounted directly on said electrically-conductive lamina, such that an enclosed wave-guide cavity is formed above said at least two separate slots, thereby forming said first slotted wave-guide;
wherein said first slotted wave-guide is operative to guide millimeter-waves over said at least two separate slots, thereby radiating millimeter-waves via said at least two separate slots, thereby forming, directly and unassisted by any intermediary element, by the at least two separate slots in conjunction with the millimeter waves radiated, a predetermined millimeter-wave radiation pattern.

2. The millimeter-wave antenna system of claim 1, further comprising at least a second slotted wave-guide operative to transport millimeter-waves alongside said first slotted wave-guide, thereby forming, together with said first slotted wave-guide, a two-dimensional radiating slot structure, operative to form a high gain millimeter-wave radiation pattern.

3. The millimeter-wave antenna system of claim 2, wherein said high gain millimeter-wave radiation pattern has a gain above 9 dBi.

4. The millimeter-wave antenna system of claim 3, wherein said two-dimensional radiating slot structure comprises at least 16 slots, resulting in said high gain millimeter-wave radiation pattern having a gain above 15 dBi.

5. The millimeter-wave antenna system of claim 4, wherein said two-dimensional radiating slot structure comprises at least 128 slots, resulting in said high gain millimeter-wave radiation pattern having a gain above 24 dBi.

6. The millimeter-wave antenna system of claim 2, wherein said first and second slotted wave-guides are injected with said millimeter-waves using a single millimeter-wave radiating source.

7. The millimeter-wave antenna system of claim 6, wherein said single millimeter-wave radiating source is connected to said first and second slotted wave-guides via a wave-guide fork.

8. The millimeter-wave antenna system of claim 2, wherein said first and second slotted wave-guides are injected with said millimeter-waves using respectively a first and second millimeter-wave radiating sources.

9. The millimeter-wave antenna system of claim 8, wherein a phase difference between said first and second millimeter-wave radiating sources is controlled, thereby controlling a direction toward which said high gain millimeter-wave radiation pattern radiates.

10. The millimeter-wave antenna system of claim 1, wherein said at least two separate slots are cut using a cutting technique associated with printed-circuit-board technology.

11. The millimeter-wave antenna system of claim 10, wherein said cut is achieved using a laser cutting technique.

12. The millimeter-wave antenna system of claim 10, wherein said cut is achieved using a punching technique.

13. The millimeter-wave antenna system of claim 10, wherein said cut is achieved using a wire-cutting technique.

14. The millimeter-wave antenna system of claim 10, wherein said cut is achieved using a printed-circuit-board etching technique.

15. The millimeter-wave antenna system of claim 1, wherein said millimeter-wave radiation pattern has a gain above 6 dBi.

16. The millimeter-wave antenna system of claim 1, wherein said electrically-conductive lamina is printed on said substrate lamina, thereby forming said printed-circuit-board.

17. The millimeter-wave antenna system of claim 1, wherein:
said electrically-conductive metal cover is bent molded or machined into a structure having a "U" shaped cross-section, such that at least one rail is formed and contact said electrically-conductive lamina which together seal electromagnetically said cavity in formation of said first slotted wave-guide, and such that two openings are formed, one opening at one end of the electrically-conductive metal cover, and another opening at the other end of the electrically-conductive metal cover;
said millimeter-waves are injected into said first slotted wave-guide via said one opening; and
the at least two separate slots are located one after the other along length of said first slotted wave-guide, such that said millimeter-waves pass over one of said at least two separate slots, and then pass over another of said at least two separate slots, on their way from said one opening to said another opening of said first slotted wave-guide.

18. The millimeter-wave antenna system of claim 17, wherein said at least two separate slots have identical dimensions.

19. The millimeter-wave antenna system of claim 18, wherein said another opening of said first slotted wave-guide is sealed electromagnetically, such that said millimeter-waves reflect back toward said one opening, thereby passing over each of said at least two separate slots at least twice.

20. The millimeter-wave antenna system of claim 19, wherein said millimeter-waves inside said first slotted wave-guide are standing-waves.

21. The millimeter-wave antenna system of claim 17, wherein said one of said at least two separate slots has smaller dimensions than said another of said at least two separate slots, thereby compensating for attenuation in said millimeter-waves as they propagate along said first slotted wave-guide.

22. The millimeter-wave antenna system of claim 1, wherein the slots form a two dimensional array.

23. A method for producing a millimeter-wave antenna system, comprising:
forming at least two separate slots in an electrically-conductive lamina of a printed-circuit-board, said at least two separate slots are operative to radiate millimeter-waves, and said at least two separate slots are located in respect to each other such as to facilitate, in conjunction with the millimeter-waves radiated, direct synthesis of a millimeter-wave radiation pattern, in which said direct synthesis is unassisted by any intermediary element; and mounting, directly on top of said electrically-conductive lamina, an electrically-conductive metal cover, such that an enclosed wave-guide cavity is formed above said at least two separate slots, thereby forming a first slotted wave-guide operative to function as a millimeter-wave antenna system.

24. The method of claim 23, wherein said at least two separate slots are formed to an accuracy of at least 25 micrometer.

25. The method of claim 24, wherein said accuracy is achieved using a laser cutting technique.

26. The method of claim 24, wherein said accuracy is achieved using a punching technique.

27. The method of claim 24, wherein said accuracy is achieved using a wire-cutting technique.

28. The method of claim 24, wherein said accuracy is achieved using a printed-circuit-board etching technique.

29. The method of claim 23, wherein said at least two separate slots are located substantially one wavelength of said millimeter-waves from each other.

30. The method of claim 23, further comprising:

forming, alongside said two separate slots, at least two additional separate slots in said electrically-conductive lamina of said printed-circuit-board, said at least two additional separate slots are operative to radiate millimeter-waves, and said at least two additional separate slots are located in respect to each other and in respect to said two separate slots such as to facilitate synthesis of a high gain millimeter-wave radiation pattern; and mounting, on top of said electrically-conductive lamina, a second electrically-conductive metal cover, such that an enclosed second wave-guide cavity is formed above said at least two additional separate slots, thereby forming a two-dimensional radiating slot structure, operative to form a high gain millimeter-wave radiation pattern.

* * * * *